(12) United States Patent
Kim et al.

(10) Patent No.: US 11,608,115 B2
(45) Date of Patent: Mar. 21, 2023

(54) CHASSIS PLATFORM MODULE FOR ELECTRIC VEHICLE

(71) Applicant: HYUNDAI MOBIS CO., LTD., Seoul (KR)

(72) Inventors: Jun Hyung Kim, Yongin-si (KR); Suk Jin Yoon, Yongin-si (KR); Hyoun Young Oh, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 242 days.

(21) Appl. No.: 17/036,415

(22) Filed: Sep. 29, 2020

(65) Prior Publication Data

US 2021/0101641 A1 Apr. 8, 2021

(30) Foreign Application Priority Data

Oct. 2, 2019 (KR) .................. 10-2019-0122184

(51) Int. Cl.
*B62D 21/15* (2006.01)
*B62D 21/03* (2006.01)
*B60K 1/04* (2019.01)
*B62D 21/11* (2006.01)

(52) U.S. Cl.
CPC .............. *B62D 21/152* (2013.01); *B60K 1/04* (2013.01); *B62D 21/03* (2013.01); *B62D 21/11* (2013.01); *B60K 2001/0438* (2013.01)

(58) Field of Classification Search
CPC .... B62D 21/152; B62D 21/155; B62D 21/03; B62D 21/11; B62D 21/02; B62D 25/2018; B62D 25/2027; B62D 27/023; B60K 1/04; B60K 2001/0438; H01M 50/249; H01M 2220/20; B60Y 2200/91
See application file for complete search history.

(56) References Cited

U.S. PATENT DOCUMENTS

| | | | |
|---|---|---|---|
| 6,923,282 B2 * | 8/2005 | Chernoff ................ | B60L 50/66 180/65.265 |
| 11,097,606 B2 * | 8/2021 | Trenne .................. | B62K 5/027 |
| 2020/0148292 A1 * | 5/2020 | Hosbach ............... | B62D 65/024 |
| 2022/0017166 A1 * | 1/2022 | Delise ................... | B62D 24/00 |

FOREIGN PATENT DOCUMENTS

| | | | |
|---|---|---|---|
| CN | 203427884 U | * | 2/2014 |
| WO | WO-2017109726 A1 | * | 6/2017 |
| WO | WO-2019178912 A1 | * | 9/2019 |

* cited by examiner

*Primary Examiner* — Lori L Lyjak
(74) *Attorney, Agent, or Firm* — Morgan, Lewis & Bockius LLP

(57) ABSTRACT

A chassis platform module for an electric vehicle may include: a frame part having a battery mounted thereon; a first support part extended from one side of the frame part in a longitudinal direction, and having a front wheel chassis module mounted thereon; and a second support part extended from the other side of the frame part in the longitudinal direction, and having a rear wheel chassis module mounted thereon.

19 Claims, 35 Drawing Sheets

CHASSIS PLATFORM MODULE FOR ELECTRIC VEHICLE

CROSS-REFERENCE TO RELATED APPLICATION

This application claims priority from and the benefit of Korean Patent Application No. 10-2019-0122184, filed on Oct. 2, 2019, which is hereby incorporated by reference for all purposes as if set forth herein.

BACKGROUND

Field

Exemplary embodiments of the present disclosure relate to a chassis platform module for an electric vehicle, and more particularly, to a chassis platform module for an electric vehicle, which can increase the degree of freedom in design and reduce a manufacturing cost.

Discussion of the Background

In general, an electric vehicle refers to a vehicle which uses electricity as power. Specifically, the electric vehicle does not acquire driving energy from combustion of fossil fuel, but acquires driving energy by rotating a motor with electricity stored in a battery.

Since the electric vehicle neither uses fossil fuel nor discharges carbon dioxide or nitrogen oxide during driving, the electric vehicle is eco-friendly. Furthermore, when the electric vehicle is driven only by an electric motor, the electric vehicle can be operated at low operation cost, and thus has an advantage in an economic aspect.

Such an electric vehicle has a structure in which a battery is detachably installed at the bottom of the body of the vehicle, and a front wheel chassis module and a rear wheel chassis module, on which wheels of the vehicle are installed, are also installed at the bottom of the body of the vehicle.

In the related art, when the body shape of the vehicle is changed, the designs of the battery, the front wheel chassis module and the rear wheel chassis module, which are mounted on the body of the vehicle, need to be changed. Thus, the degree of freedom in design is lowered while the manufacturing cost is increased. Therefore, there is a need for a device capable of solving the problem.

SUMMARY

Various embodiments are directed to a chassis platform module for an electric vehicle, which can increase the degree of freedom in design and reduce a manufacturing cost because a battery, a front wheel chassis module and a rear wheel chassis module are commonly used even when the design of the body of a vehicle is changed.

In an embodiment, a chassis platform module for an electric vehicle may include: a frame part having a battery mounted thereon; a first support part extended from one side of the frame part in a longitudinal direction, and having a front wheel chassis module mounted thereon; and a second support part extended from the other side of the frame part in the longitudinal direction, and having a rear wheel chassis module mounted thereon.

The frame part may include: a first frame facing one side of the battery in the longitudinal direction; a second frame facing the other side of the battery in the longitudinal direction; a first side support part configured to connect the first and second frames, and facing one side of the battery in a widthwise direction; and a second side support part configured to connect the first and second frames, and facing the other side of the battery in the widthwise direction.

The frame part may further include: a fastening bolt configured to a battery base, provided on the bottom surface of the battery, to at least any one of the first frame, the second frame, the first side support part and the second side support part; and a protection barrier installed at a position facing the fastening bolt, formed as a barrier protruding outward, and configured to protect the fastening bolt.

The first support part may include: a first support body having a bottom side connected to the front wheel chassis module and a top side connected to a body part of a vehicle; and a first connection part configured to connect the first support body and the frame part.

The first support body may be installed at a position higher than the frame part.

The first connection part may be inclined downward toward the frame part from the first support body.

The first support part may further include a shock tower protruding from either side of the first support body, and connected to a shock absorber provided on the front wheel chassis module.

The chassis platform module may further include: a stress distribution part connected to the first support part, and configured to distribute stress transferred to the frame part from the first support part; and a movement guide part configured to guide the stress distribution part to move downward along the first support part in case of an accident of the vehicle.

The stress distribution part may include: a cross member coupled to the bottom of the first support part; and a fixed bracket extended from the cross member and fixed to the first support part or the frame part.

The movement guide part may include: a first inclined guide part extended from the first connection part toward the fixed bracket, and having a first inclined surface formed at the bottom thereof; a second inclined guide part having a second inclined surface which protrudes from the fixed bracket and abuts on the first inclined surface; and a fixed member fixed to the first inclined guide part through the second inclined guide part.

The first connection part may include: a first connection body connected to the frame part; and a connector part configured to connect the first connection body and the first support body.

The connector part may include: a first coupling part having a groove into which an end of the first support body is inserted; a second coupling part having a groove into which an end of the first connection body is inserted; and a connection body part configured to connect the first coupling part and the second coupling part.

The connector part may further include a weight reduction part connected to the first coupling part, and installed at a position facing an end of the first connection body with the connection body part interposed therebetween.

The second support part may include: a second support body having a bottom side connected to the rear wheel chassis module and a top side connected to the body part of the vehicle; and a second connection part configured to connect the second support body and the frame part.

The second support body may be installed at a position higher than the frame part.

The second connection part may be inclined downward toward the frame part from the second support body.

The front wheel chassis module may be connected to the first support part, the rear wheel chassis module may be connected to the second support part, the battery may be mounted on the frame part to form an integrated module, and the integrated module may be coupled to the body part of the vehicle.

In an embodiment, a chassis platform module for an electric vehicle may include: a first frame facing one side of a battery in a longitudinal direction; a second frame facing the other side of the battery in the longitudinal direction; a first side support part configured to connect the first and second frames, and facing one side of the battery in a widthwise direction; a second side support part configured to connect the first and second frames, and facing the other side of the battery in the widthwise direction; and a separation induction part installed on at least any one of the first and second side support parts, and configured to induce the battery to be separated in a direction opposite to the direction in which impact is applied.

The separation induction part may include: a first induction part formed as a notch-shaped groove at a side surface of the first side support part; and a second induction part formed as a notch-shape groove at a side surface of the second side support part.

The plurality of first induction parts may be installed in the longitudinal direction of the first side support part, and the notch-shaped grooves may be extended in a top-to-bottom direction. The plurality of second induction parts may be installed in the longitudinal direction of the second side support part, and the notch-shaped grooves may be extended in the top-to-bottom direction.

In accordance with the embodiments of the present disclosure, since the front wheel chassis module is connected to the first support part, the rear wheel chassis module is connected to the second support part, the battery is mounted on the frame part so as to form an integrated module, and the integrated module is coupled to the body part of the vehicle, the design of the body part of the vehicle may be easily changed to reduce a manufacturing cost while increasing the degree of freedom in design.

DETAILED DESCRIPTION OF THE ILLUSTRATED EMBODIMENTS

Hereinafter, a chassis platform module for an electric vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
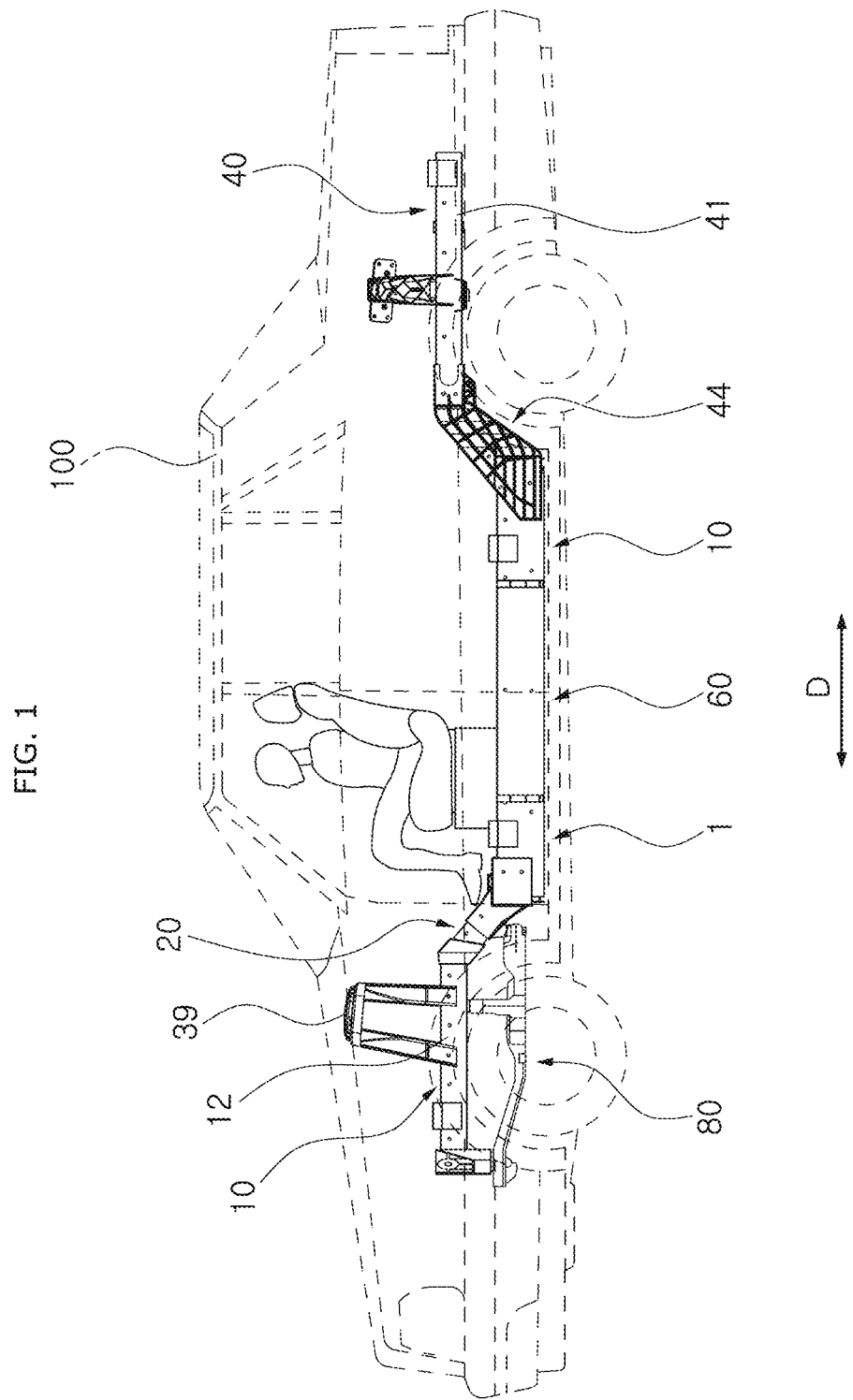
FIG. 1 is a diagram illustrating a state in which a chassis platform module for an electric vehicle in accordance with an embodiment of the present disclosure is coupled to a body part of the vehicle.
Figure 2:
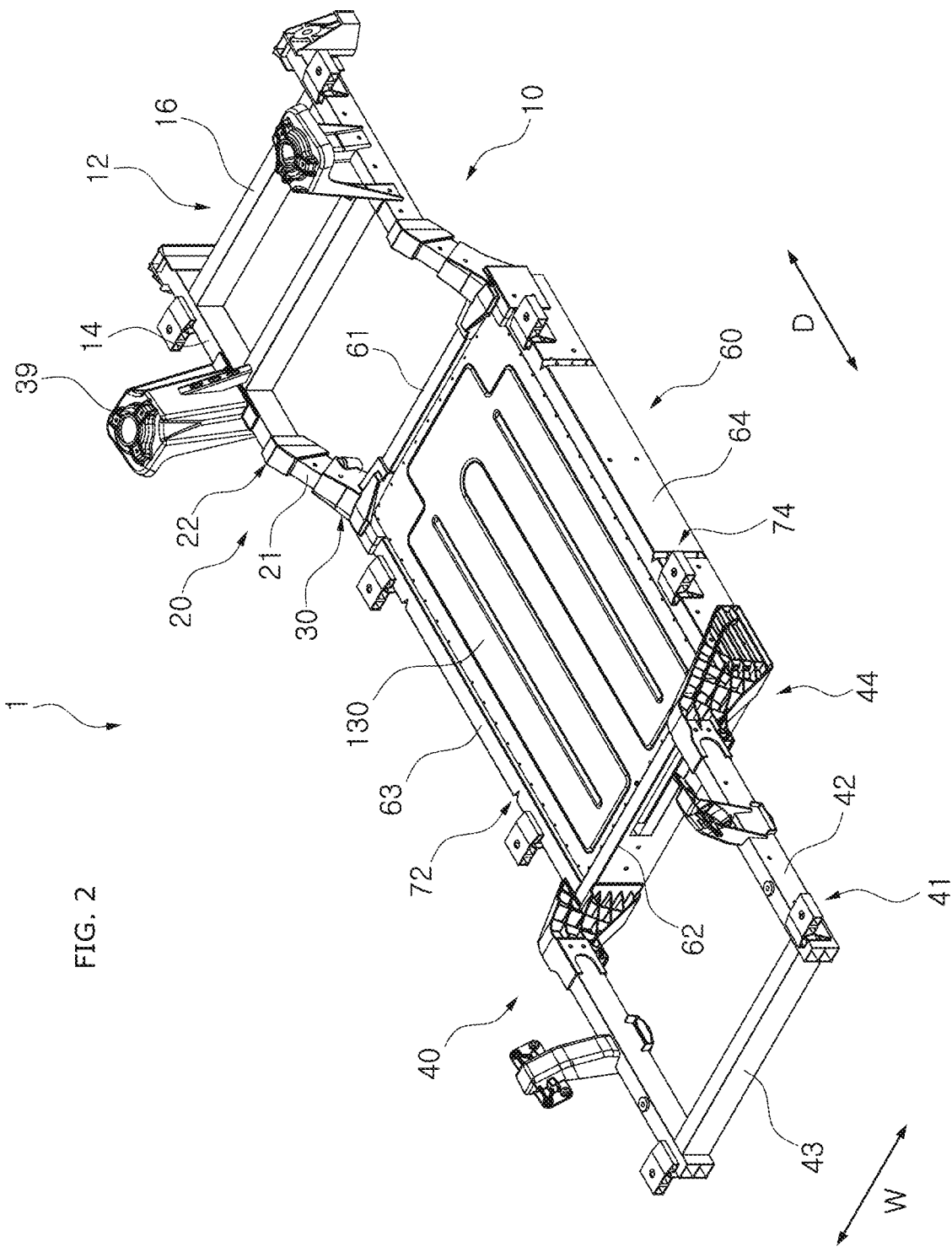
FIG. 2 is a perspective view illustrating a state in which a battery is installed in a frame part in accordance with the embodiment of the present disclosure.
Figure 3:
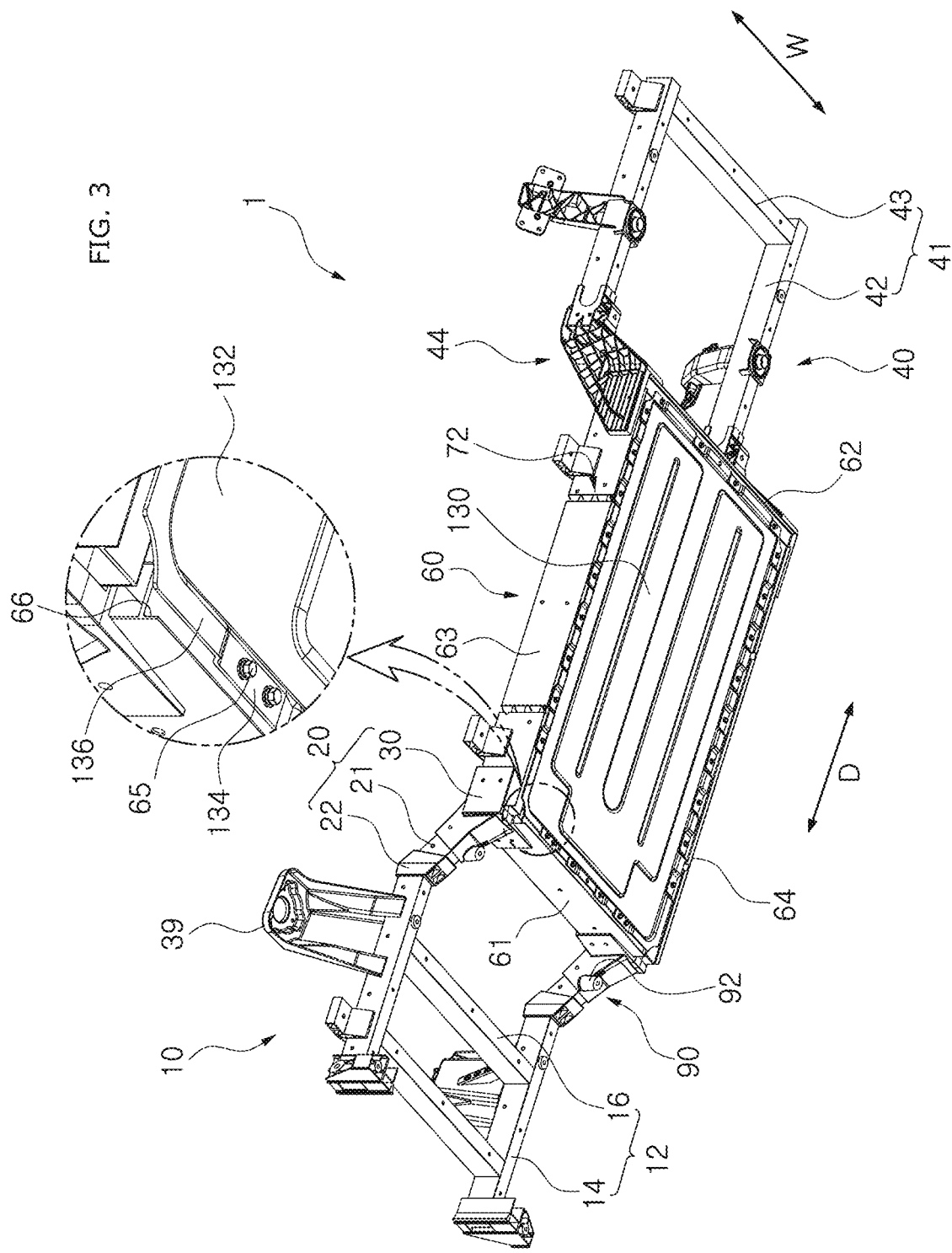
FIG. 3 is a perspective view illustrating a state in which a fastening bolt in accordance with the embodiment of the present disclosure is installed.
Figure 4:
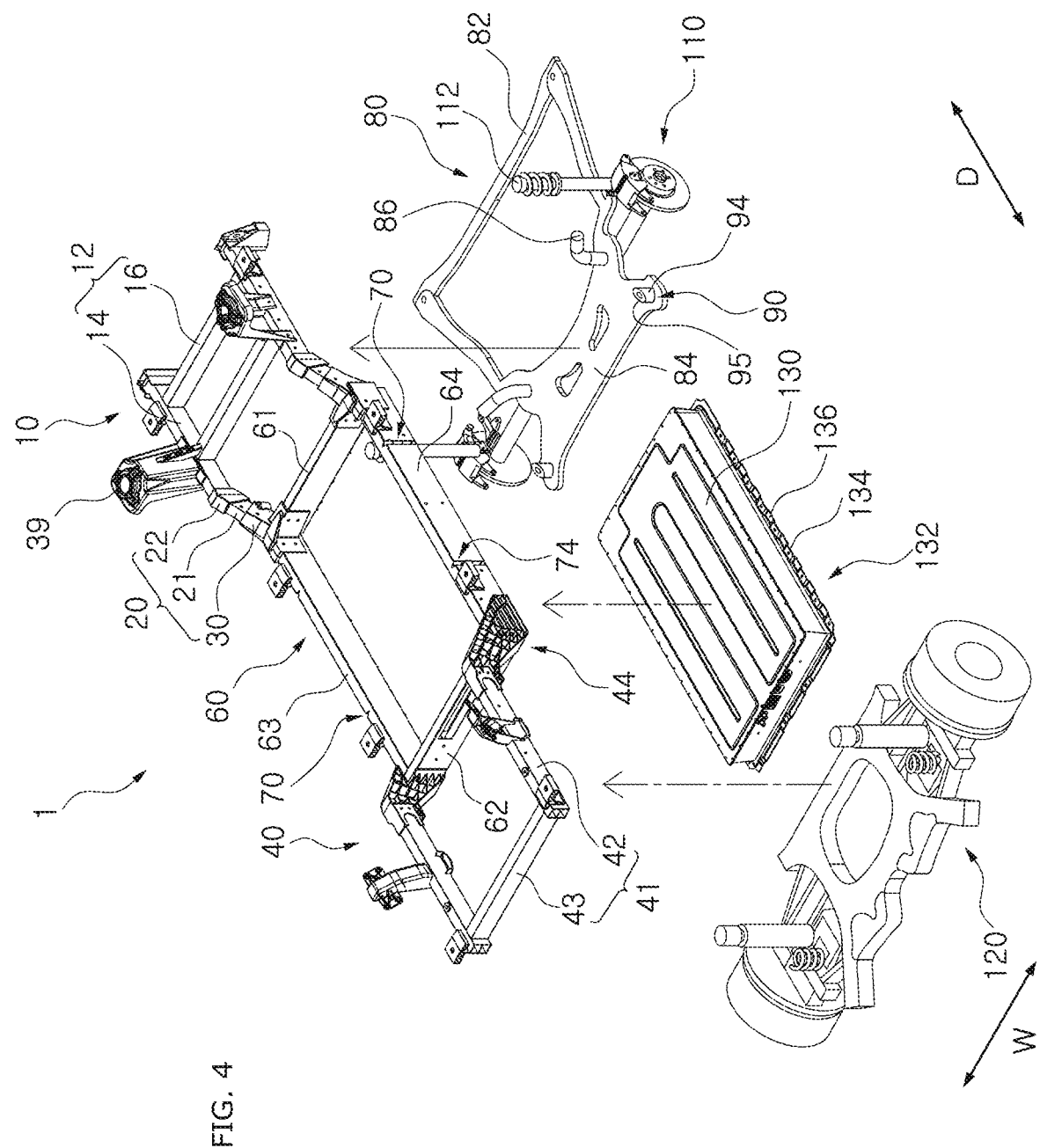
FIG. 4 is an exploded perspective view of the chassis platform module for an electric vehicle in accordance with the embodiment of the present disclosure.
Figure 5:
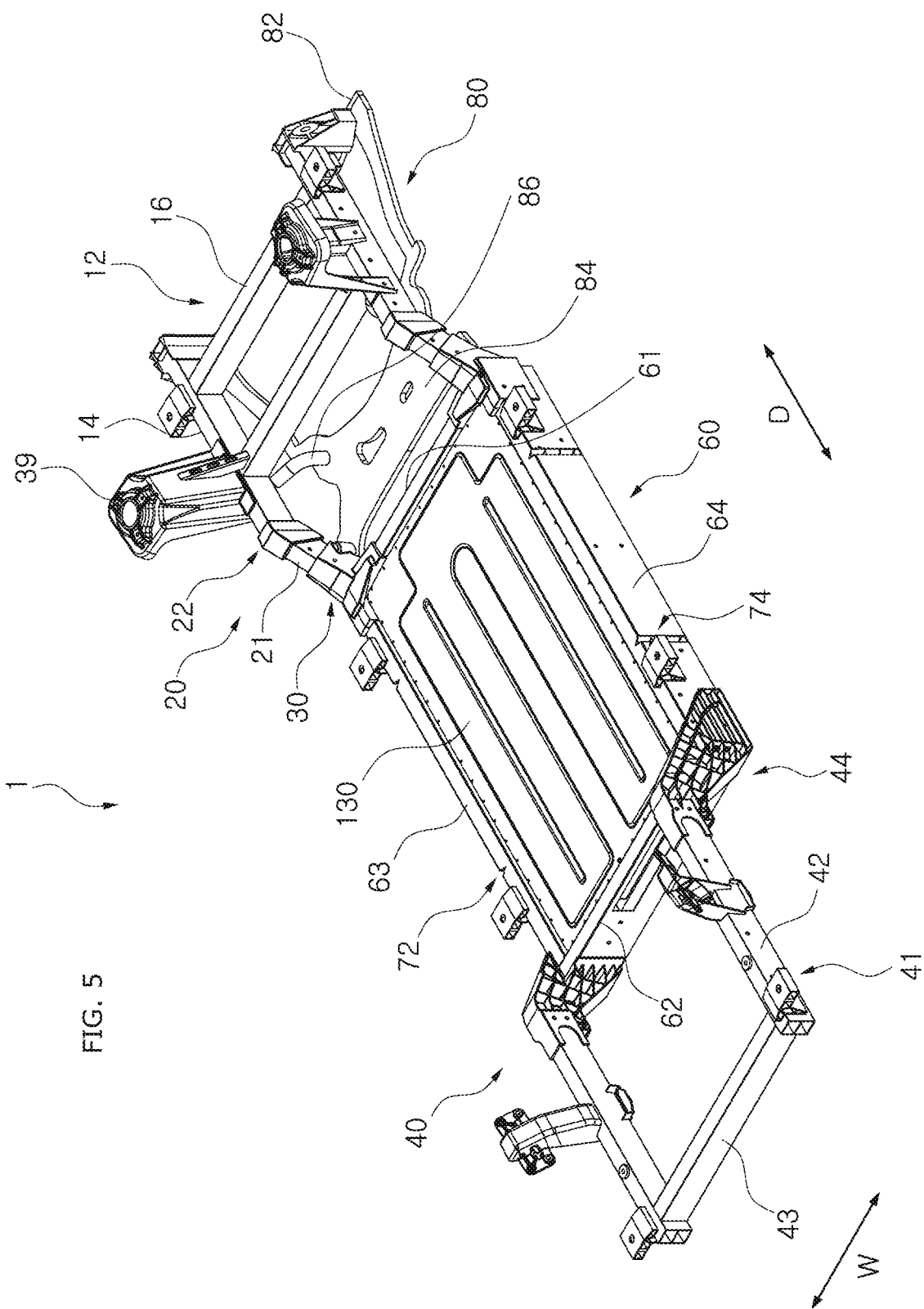
FIG. 5 is a perspective view illustrating a state in which a stress distribution part in accordance with the embodiment of the present disclosure is coupled to the frame part.
Figure 6:
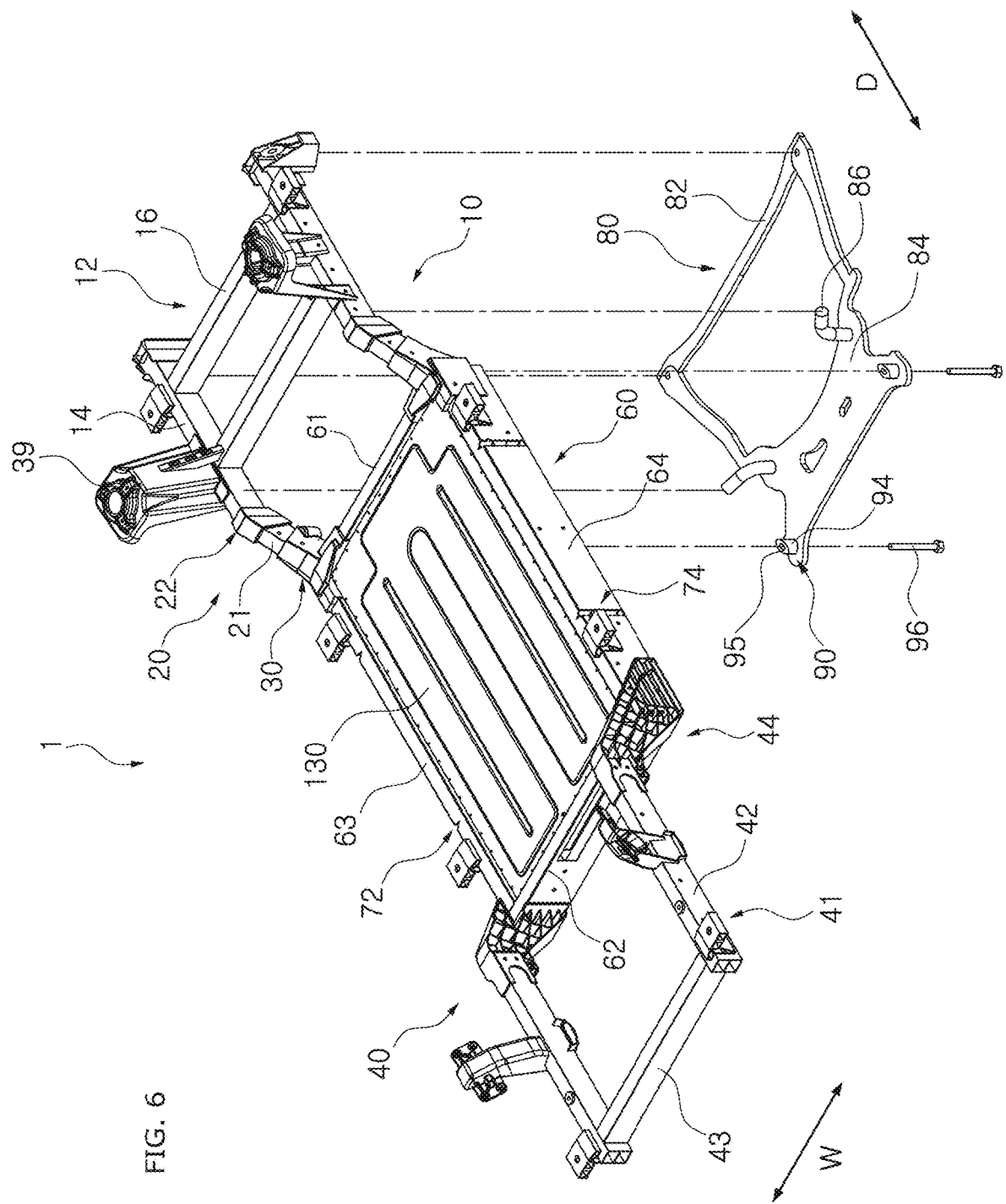
FIG. 6 is a perspective view illustrating a state in which the stress distribution part in accordance with the embodiment of the present disclosure is separated from the frame part.
Figure 7:
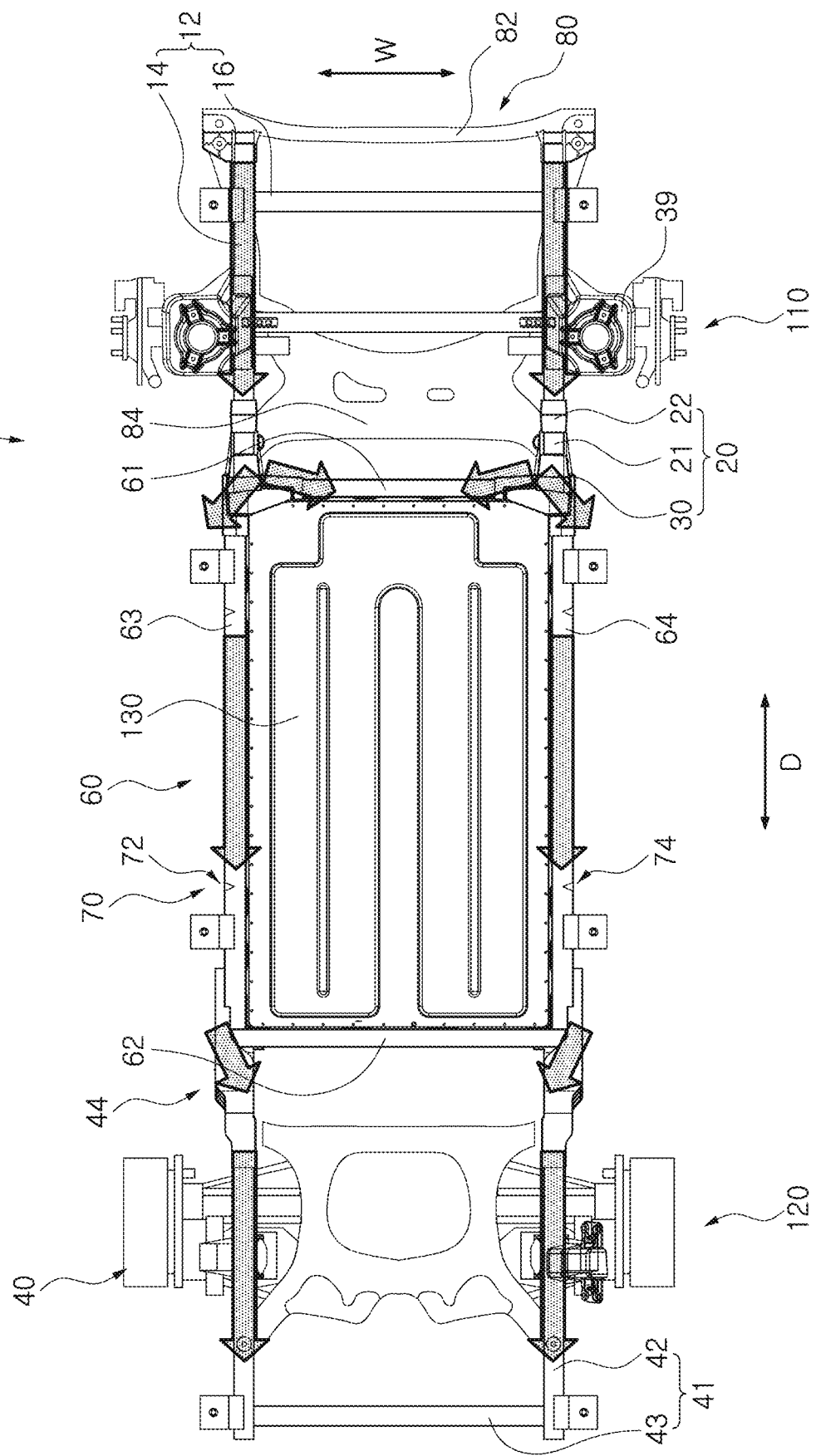
FIG. 7 is a plan view illustrating a path through which a load is transferred along the chassis platform module for an electric vehicle in accordance with the embodiment of the present disclosure.
Figure 8:
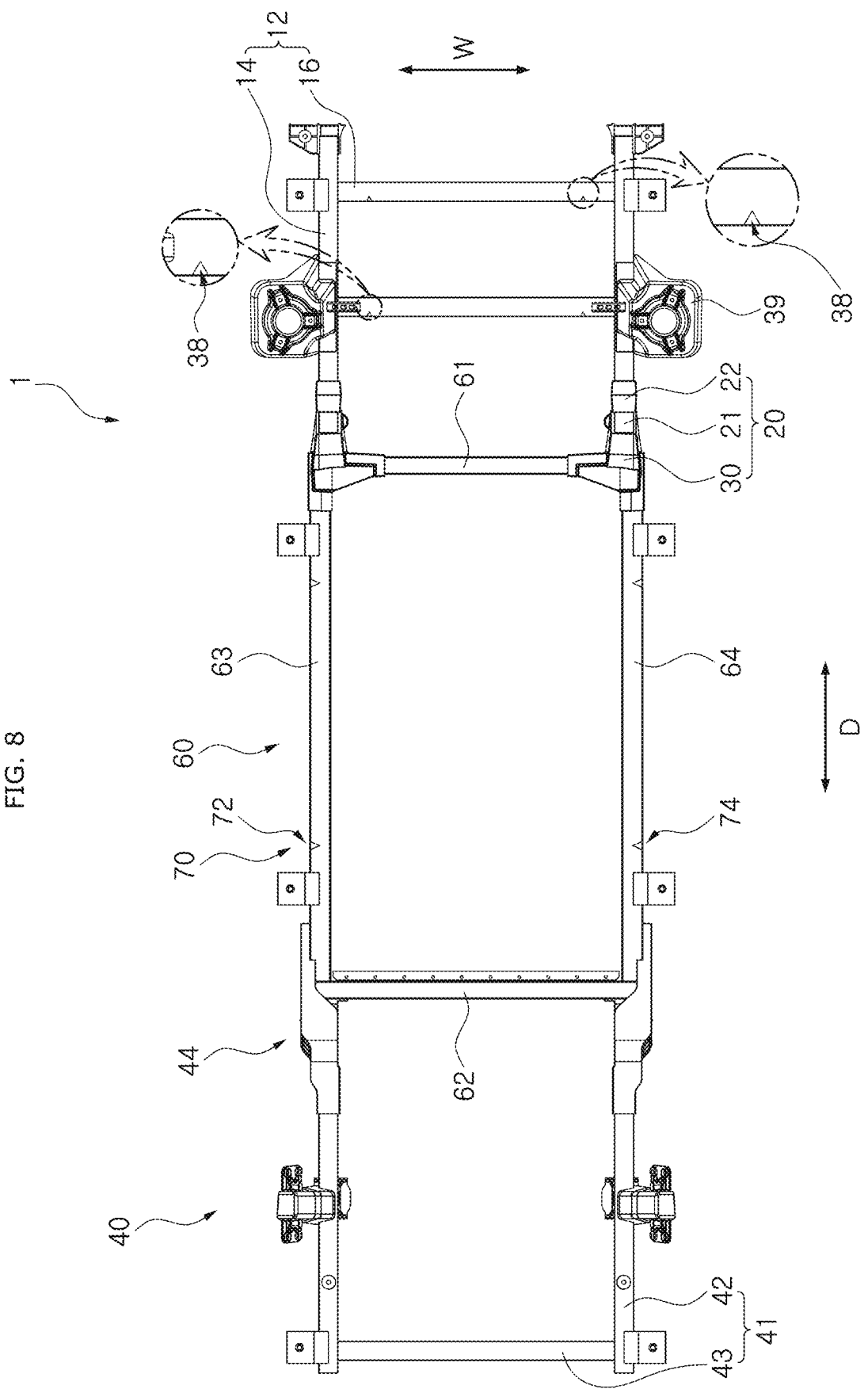
FIG. 8 is a plan view illustrating a state in which a cutting induction part in accordance with the embodiment of the present disclosure is installed on a first reinforcement frame.
Figure 9:
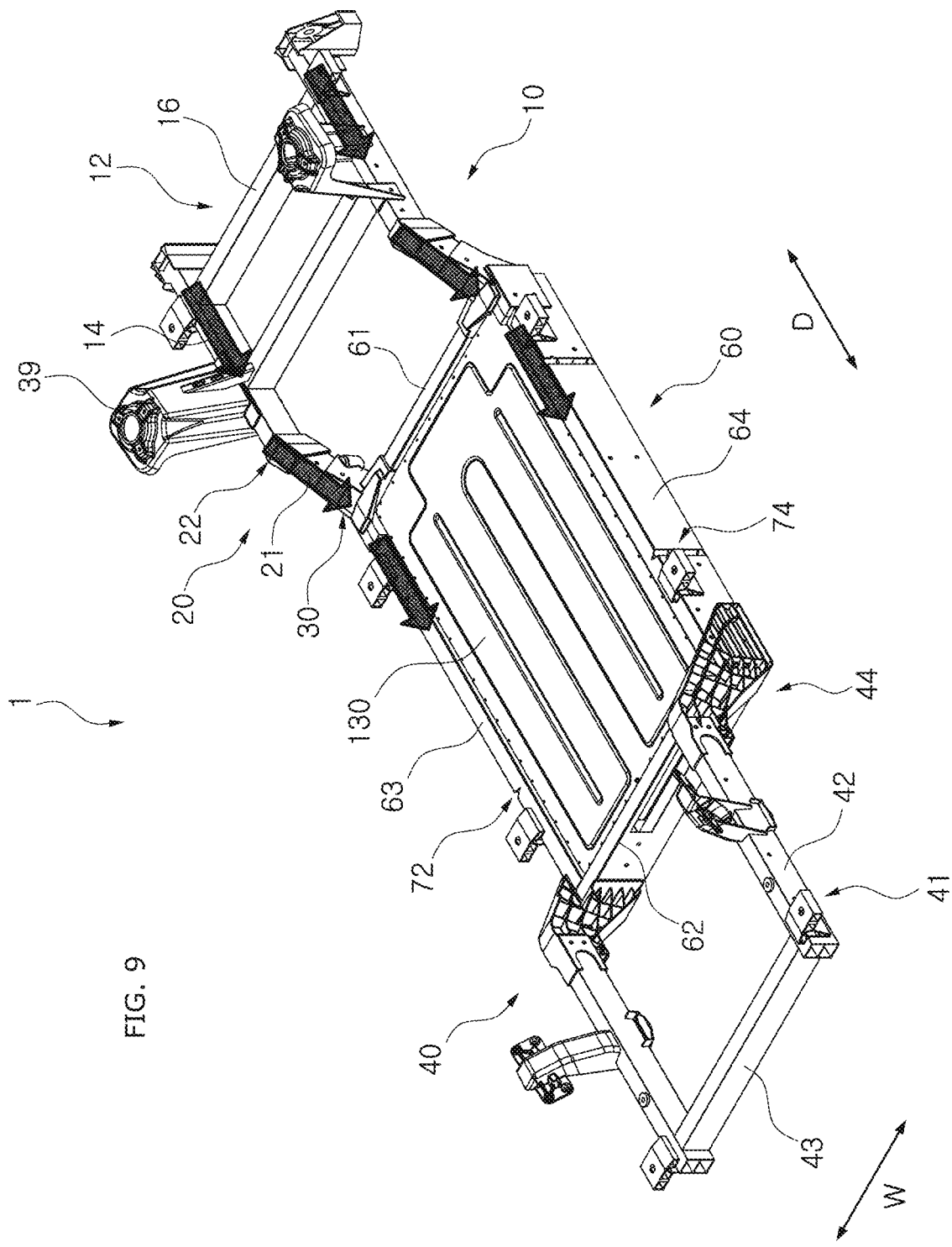
FIG. 9 is a perspective view illustrating a path through which a load is transferred along the chassis platform module for an electric vehicle in accordance with the embodiment of the present disclosure.
Figure 10:
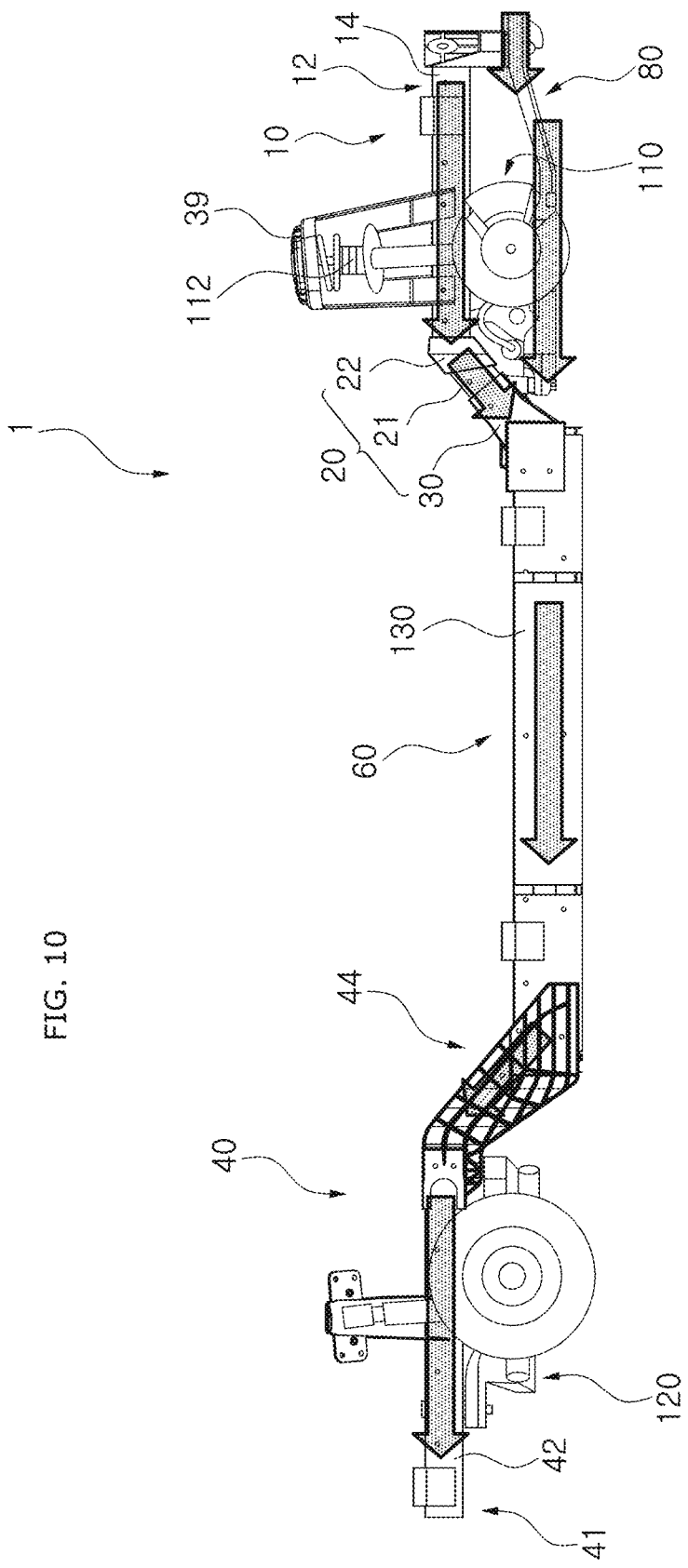
FIG. 10 is a front view illustrating a path through which a load is transferred through the chassis platform module for an electric vehicle in accordance with the embodiment of the present disclosure.
Figure 11:
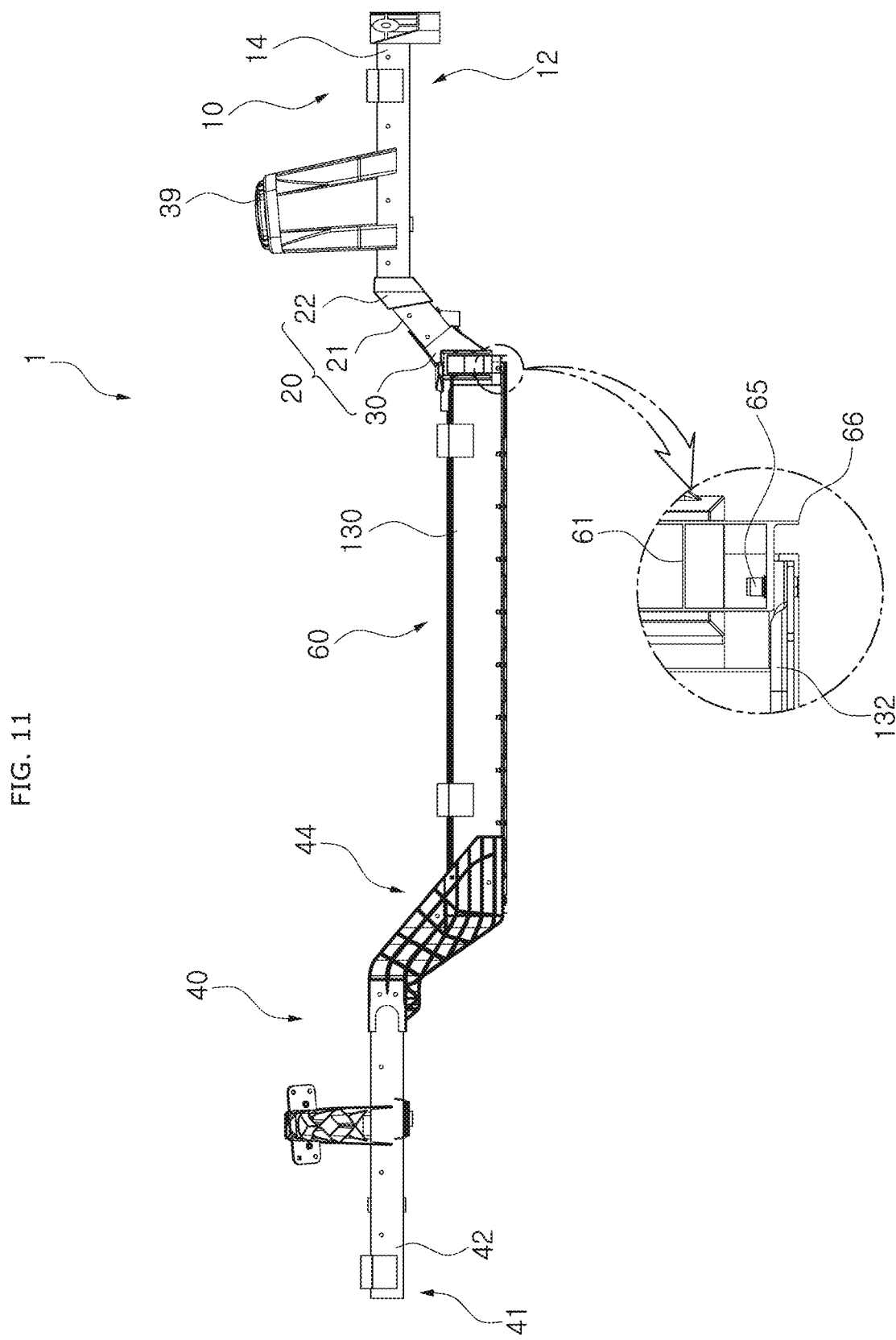
FIG. 11 is a front view illustrating a state in which a fastening bolt and a protective barrier in accordance with the embodiment of the present disclosure are installed.
Figure 12:
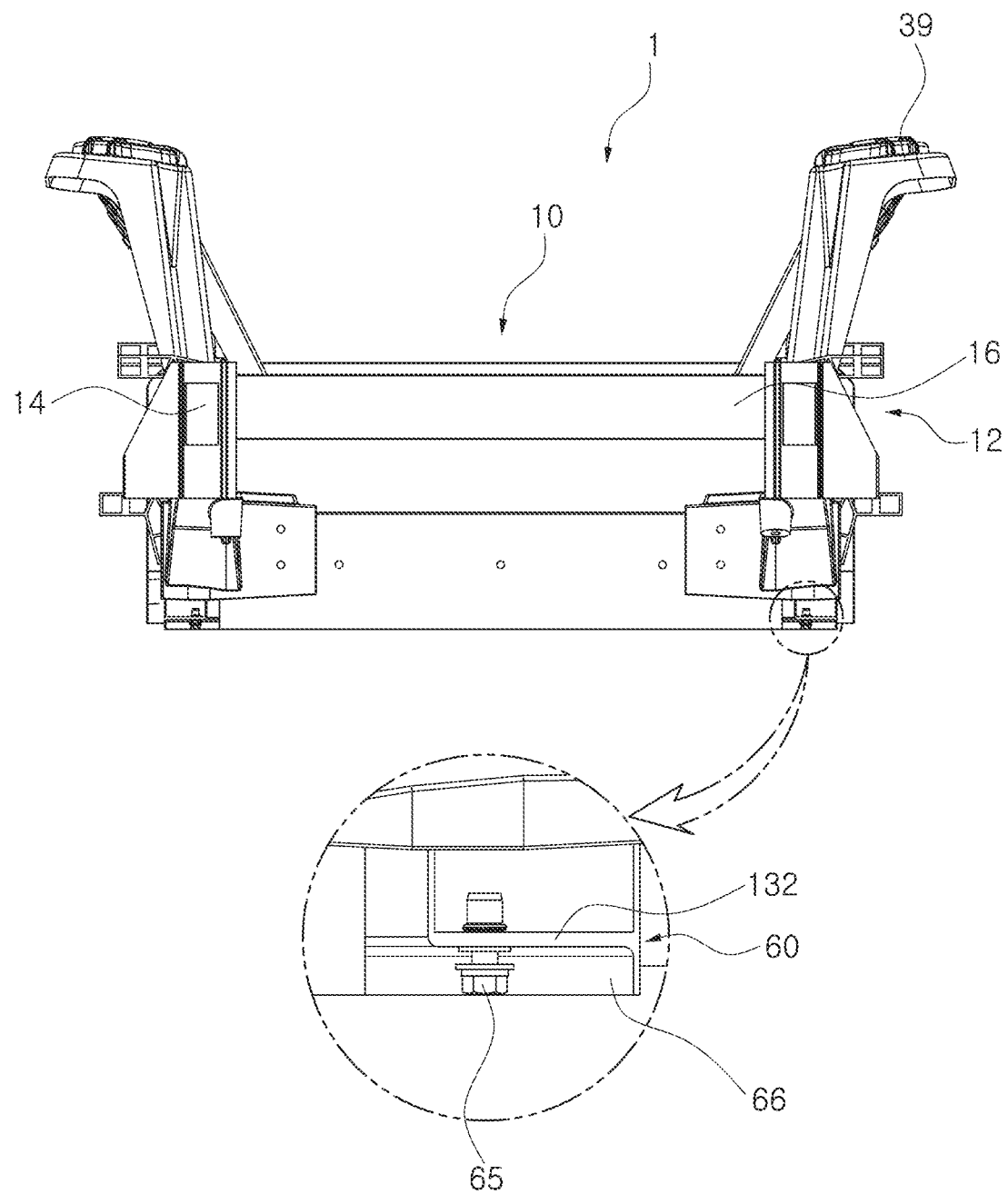
FIG. 12 is a side view illustrating a state in which the fastening bolt and the protective barrier in accordance with the embodiment of the present disclosure are installed.

FIG. 1 is a diagram illustrating a state in which a chassis platform module for an electric vehicle in accordance with an embodiment of the present disclosure is coupled to a body part of the vehicle, FIG. 2 is a perspective view illustrating a state in which a battery is installed in a frame part in accordance with the embodiment of the present disclosure, FIG. 3 is a perspective view illustrating a state in which a fastening bolt in accordance with the embodiment of the present disclosure is installed, FIG. 4 is an exploded perspective view of the chassis platform module for an electric vehicle in accordance with the embodiment of the present disclosure, FIG. 5 is a perspective view illustrating a state in which a stress distribution part in accordance with the embodiment of the present disclosure is coupled to the frame part, FIG. 6 is a perspective view illustrating a state in which the stress distribution part in accordance with the embodiment of the present disclosure is separated from the frame part, FIG. 7 is a plan view illustrating a path through which a load is transferred along the chassis platform module for an electric vehicle in accordance with the embodiment of the present disclosure, FIG. 8 is a plan view illustrating a state in which a cutting induction part in accordance with the embodiment of the present disclosure is installed on a first reinforcement frame, FIG. 9 is a perspective view illustrating a path through which a load is transferred along the chassis platform module for an electric vehicle in accordance with the embodiment of the present disclosure, FIG. 10 is a front view illustrating a path through which a load is transferred through the chassis platform module for an electric vehicle in accordance with the embodiment of the present disclosure, FIG. 11 is a front view illustrating a state in which a fastening bolt and a protective barrier in accordance with the embodiment of the present disclosure are installed, and FIG. 12 is a side view illustrating a state in which the fastening bolt and the protective barrier in accordance with the embodiment of the present disclosure are installed.

As illustrated in FIGS. 1 to 12, a chassis platform module 1 for an electric vehicle in accordance with an embodiment of the present disclosure may include a first support part 10, a second support part 40, a frame part 60, a separation induction part 70, a stress distribution part 80 and a movement guide part 90. If necessary, the chassis platform module 1 may further include a front wheel chassis module 110, a rear wheel chassis module 120 and a battery 130.

The front wheel chassis module 110 is attached to/detached from the first support part 10, the rear wheel chassis module 120 is attached to/detached from the second support part 40, and the battery 130 is attached to/detached from the frame part 60. Therefore, part replacement and maintenance may be easily performed. The first support part 10, the second support part 40, the frame part 60, the separation induction part 70, the stress distribution part 80, the movement guide part 90, the front wheel chassis module 110, the rear wheel chassis module 120 and the battery 130 may be coupled to form the chassis platform module 1 for an electric vehicle. Since the chassis platform module 1 for an electric vehicle is coupled to a body part 100 of the vehicle, the chassis platform module 1 provides a structure which has advantages in making room for a passenger and mounting a vehicle body.

The first support part 10 is extended from one side of the frame part 60 in a longitudinal direction D, and the front wheel chassis module 110 is mounted on the first support part 10. The first support part 10 for supporting the front wheel chassis module 110 includes a first support body 12, a first connection part 20, a cutting induction part 38 and a shock tower 39.

The bottom of the first support body 12 is connected to the front wheel chassis module 110, and the top of the first support body 12 is connected to the body part 100 of the vehicle. The first support body 12 is installed at a position higher than the frame part 60, and separated from the frame part 60 and extended in the longitudinal direction D of the frame part 60.

The first support body 12 in accordance with the embodiment of the present disclosure includes a pair of first support frames 14 and a first reinforcement frame 16. The pair of first support frames 14 are spaced apart from each other in a widthwise direction W and installed in parallel to each other, and the first reinforcement frame 16 connects the pair of first support frames 14 in the widthwise direction W. The first support body 12 is installed in a rectangular shape, the pair of first support frames 14 are installed in parallel to face each other, and the first reinforcement frames 16 installed in a shape crossing the first support frames 14 are also installed in parallel to face each other. At the top of the first support body 12, a driver seat and a passenger seat are located. The first support body 12 is detachably installed on the body part 100 of the vehicle.

The first connection part 20 can be modified in various manners as long as the first connection part 20 connects the first support body 12 and the frame part 60. The first connection part 20 in accordance with the embodiment of the present disclosure includes a first connection body 21, a connector part 22 and a reinforcement connection part 30.

The first connection body 21 is directly connected to the frame part 60, and connected to the frame part 60 through the reinforcement connection part 30. The first connection body 21 is extended from the first support body 12 toward the frame part 60. If necessary, the connector part 22 is installed at the top of the first connection body 21, and the reinforcement connection part 30 is installed at the bottom of the first connection body 21. The first connection body 21 is formed in a bar shape, and inclined downward from the first support body 12 toward the frame part 60.

Figure 32:
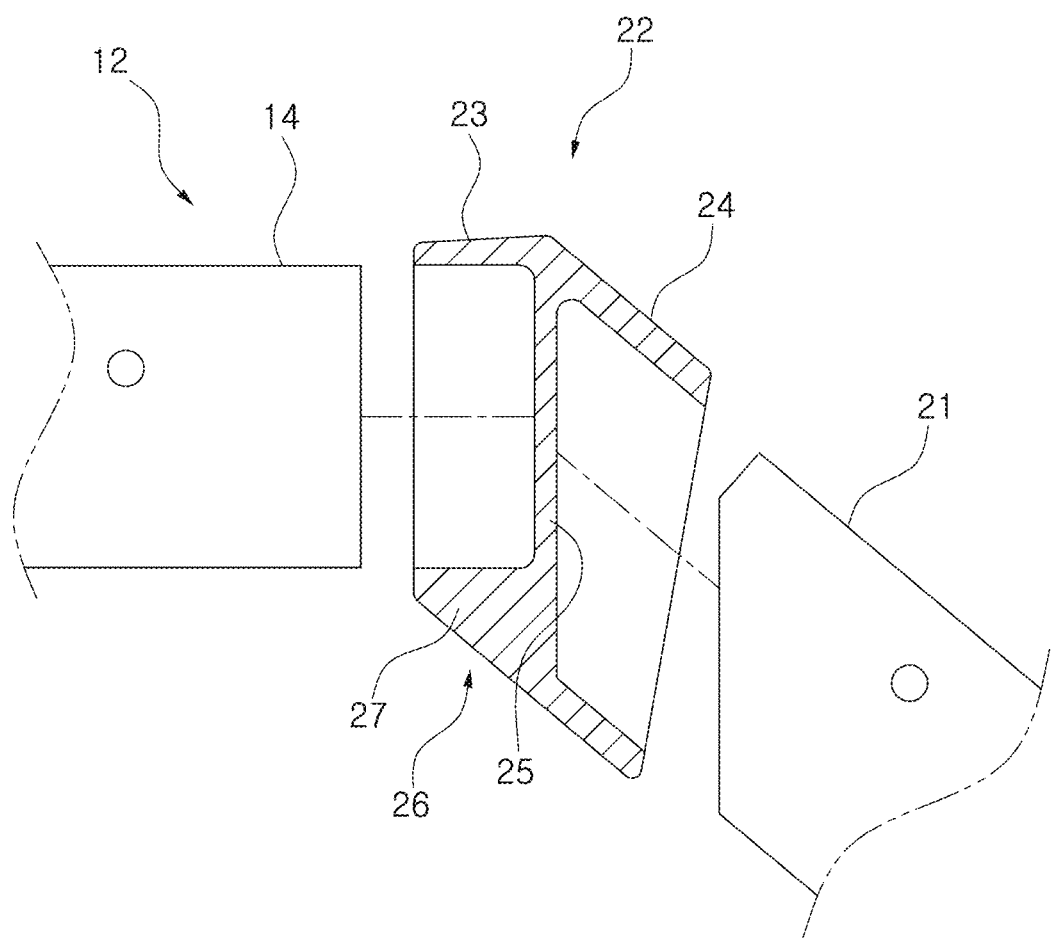
FIG. 32 is a cross-sectional view illustrating a state before a connector part in accordance with the embodiment of the present disclosure is connected to a first support frame and a first connection body.
Figure 33:
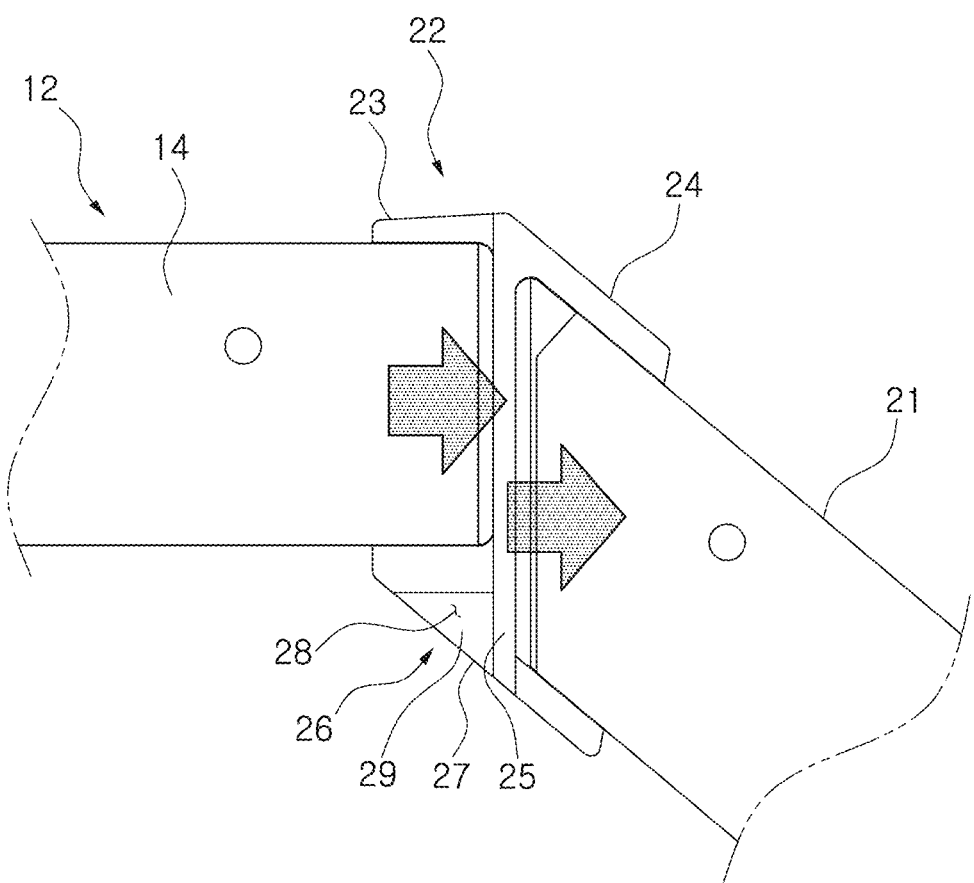
FIG. 33 is a cross-sectional view illustrating a state in which the connector part in accordance with the embodiment of the present disclosure is installed.
Figure 34:
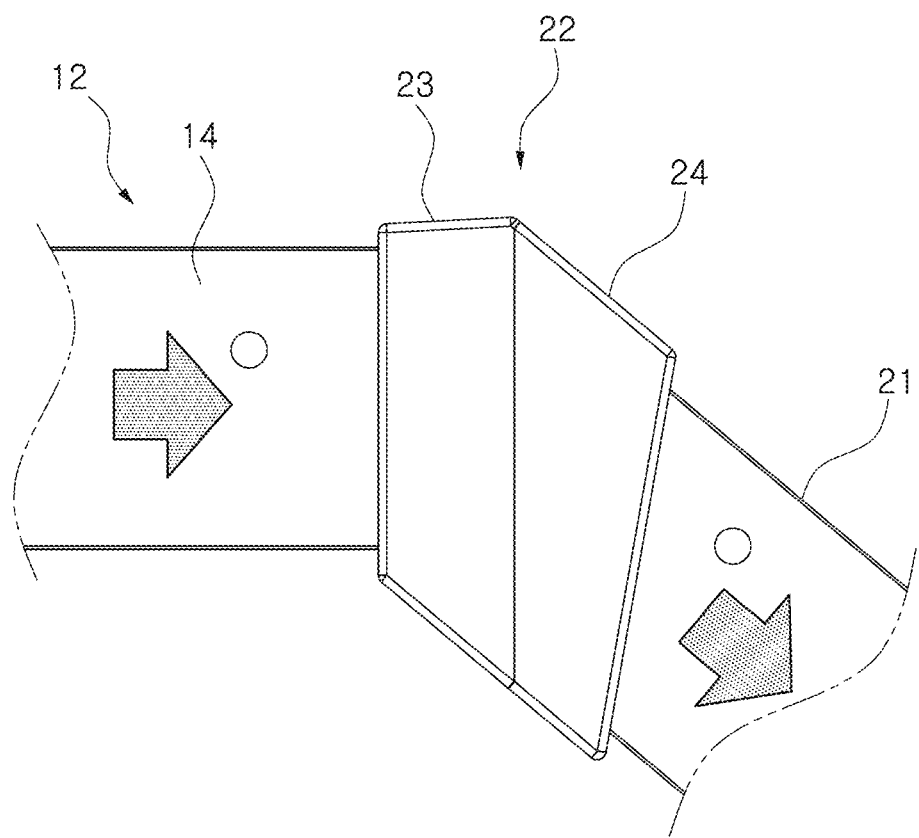
FIG. 34 is a front view illustrating a state in which the connector part in accordance with the embodiment of the present disclosure is installed.
Figure 35:
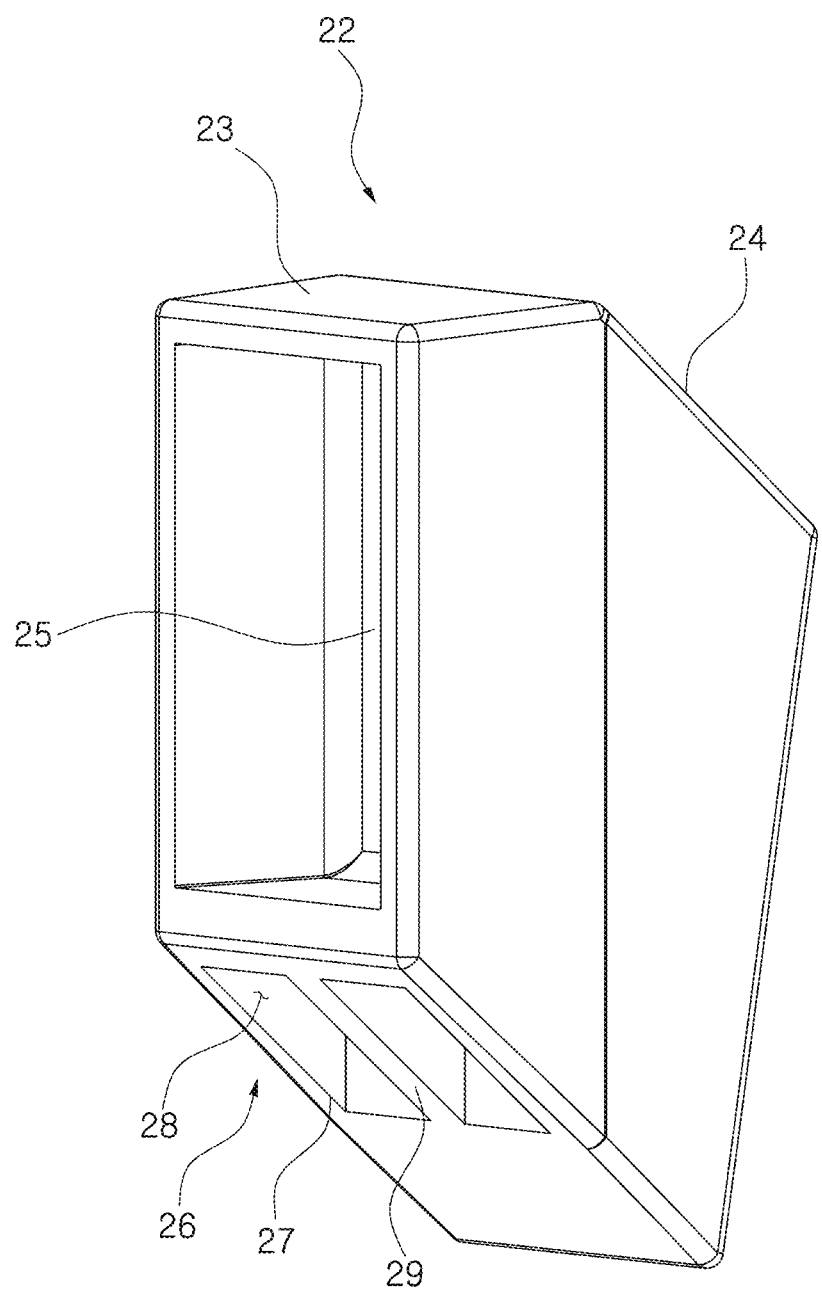
FIG. 35 is a perspective view illustrating the connector part in accordance with the embodiment of the present disclosure.

FIG. 32 is a cross-sectional view illustrating a state before the connector part in accordance with the embodiment of the present disclosure is connected to the first support frame and the first connection body, FIG. 33 is a cross-sectional view illustrating a state in which the connector part in accordance with the embodiment of the present disclosure is installed, FIG. 34 is a front view illustrating a state in which the connector part in accordance with the embodiment of the present disclosure is installed, and FIG. 35 is a perspective view illustrating the connector part in accordance with the embodiment of the present disclosure.

As illustrated in FIGS. 32 to 35, the connector part can be modified in various shapes as long as the connector part connects the first connection body 21 and the first support body 12. The connector part 22 in accordance with the embodiment of the present disclosure includes a first coupling part 23, a second coupling part 24, a connection body part 25 and a weight reduction part 26.

The first coupling part 23 has a groove into which an end portion of the first support body 12 is inserted. The first coupling part 23 is horizontally installed, and the end of the first support body 12 is detachably installed in the first coupling part 23.

The second coupling part 24 has a groove into which an end of the first connection body 21 is inserted, and is inclined downward toward the first connection body 21. The first and second coupling parts 23 and 24 are open in directions opposite to each other, and the connection body part 25 is installed between the first and second coupling parts 23 and 24.

The connection body part 25 can be modified in various shapes as long as the connection body part 25 connects the first and second coupling parts 23 and 24. The connection body part 25 in accordance with the embodiment of the present disclosure is installed in a plate shape to divide internal spaces of the first and second coupling parts 23 and 24.

An end of the first support frame 14 is located on one side of the connection body part 25, and an end of the first connection body 21 is located on the other side of the connection body part 25. Therefore, a load transferred along the first support frame 14 is transferred to the first connection body 21 through the connection body part 25.

The weight reduction part 26 can be modified in various shapes as long as the weight reduction part 26 is connected to the first coupling part 23 and installed at a position facing the end of the first connection body 21 with the connection body part 25 interposed therebetween. The weight reduction part 26 in accordance with the embodiment of the present disclosure includes a weight reduction body 27, a weight reduction groove 28 and a barrier member 29.

The weight reduction body 27 is connected to the bottom of the first coupling part 23. The weight reduction body 27 in accordance with the embodiment of the present disclosure is located at the bottom of the first support frame 14, and installed at a position facing the end of the first connection body 21 with the connection body part 25 interposed therebetween.

Since the weight reduction groove 28 is formed as a hole at the bottom of the weight reduction body 27, the weight reduction groove 28 may reduce the weight of the connector part 22. The barrier member 29 is installed as a plate-shape rib in the weight reduction groove 28, and thus raises the structural stiffness of the weight reduction part 26.

Since the connector part 22 is a cast structure formed as one body and has a bent shape, the connector part 22 has advantages in increasing buckling inner stiffness and transferring a load. Since a load transferred along the first support frame 14 through the connection body part 25 having a barrier structure is transferred to the first connection body 21, the transfer rate of an impact load is increased.

Furthermore, since the first support frame 14 and the first connection body 21 are forced into the connector part 22, the working time is reduced. Since the connector part 22 having a bent shape is used, the impact load transferred from the front of the vehicle is moved in a horizontal direction, and then moved in an inclined direction through the connector part 22. Thus, the impact load can be more rapidly and easily distributed.

Figure 26:
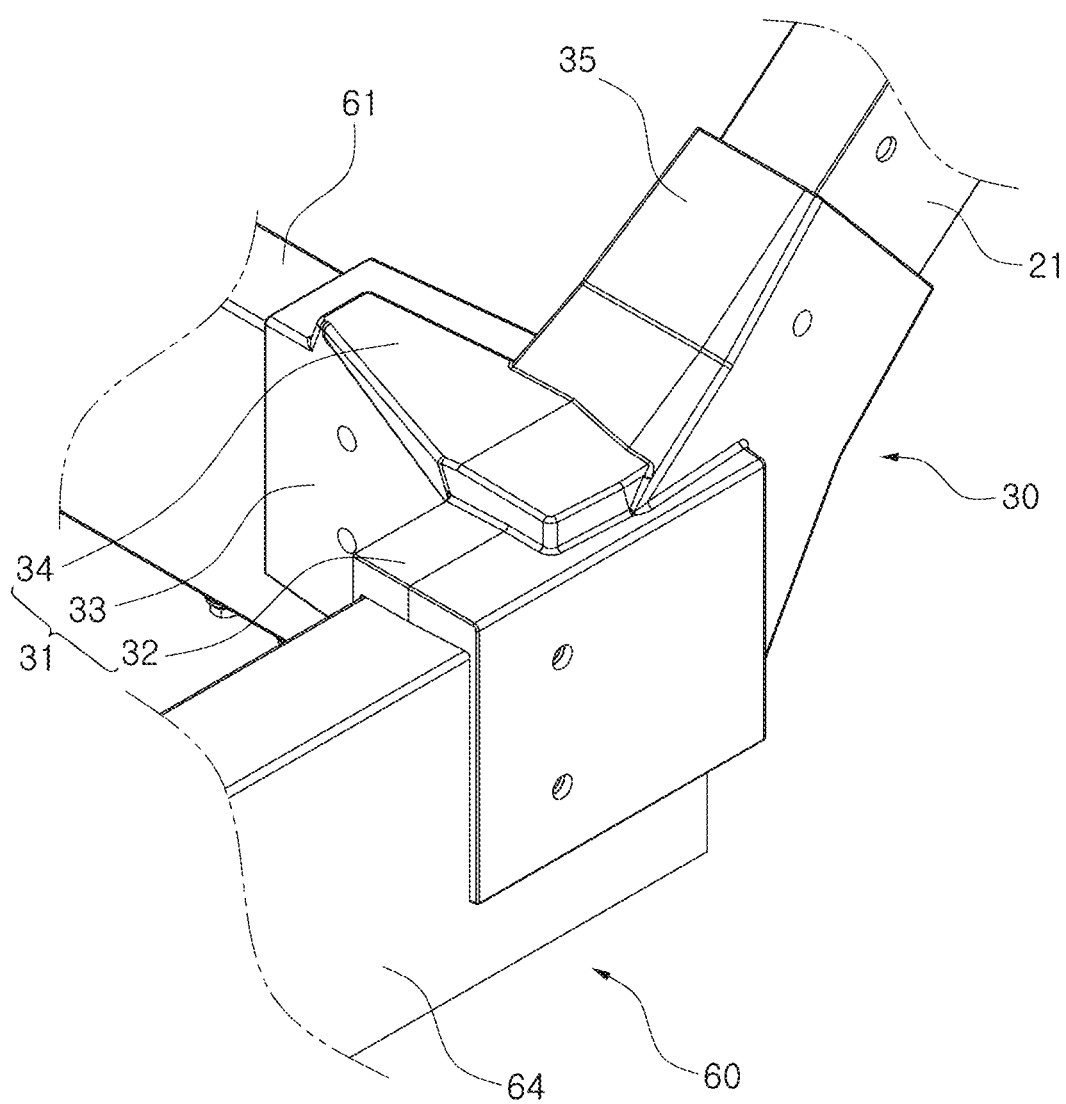
FIG. 26 is a perspective view illustrating a state in which a reinforcement connection part in accordance with the embodiment of the present disclosure is installed.
Figure 27:
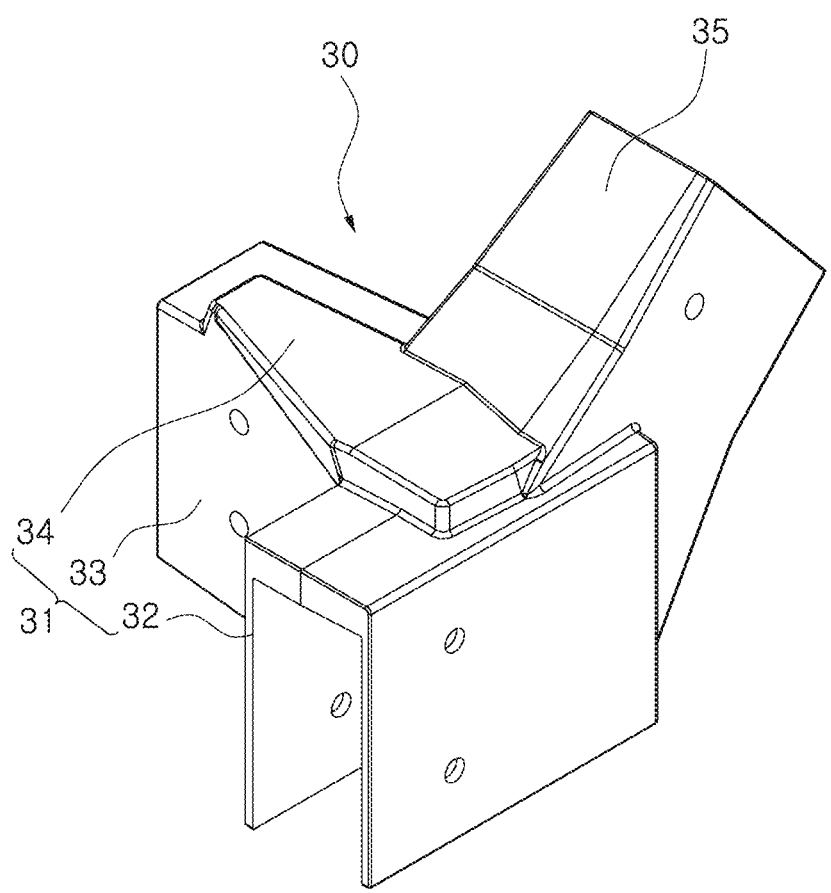
FIG. 27 is a perspective view illustrating the reinforcement connection part in accordance with the embodiment of the present disclosure.
Figure 28:
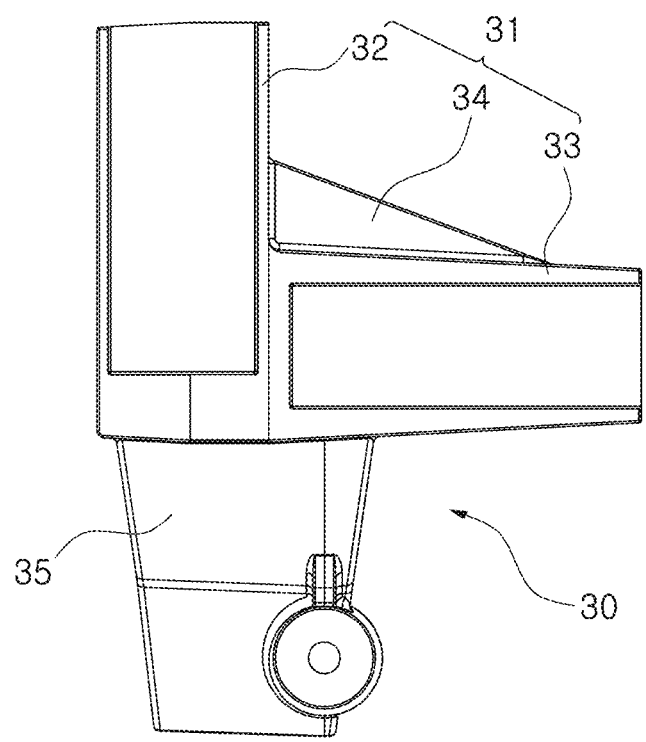
FIG. 28 is a bottom view of the reinforcement connection part in accordance with the embodiment of the present disclosure.
Figure 29:
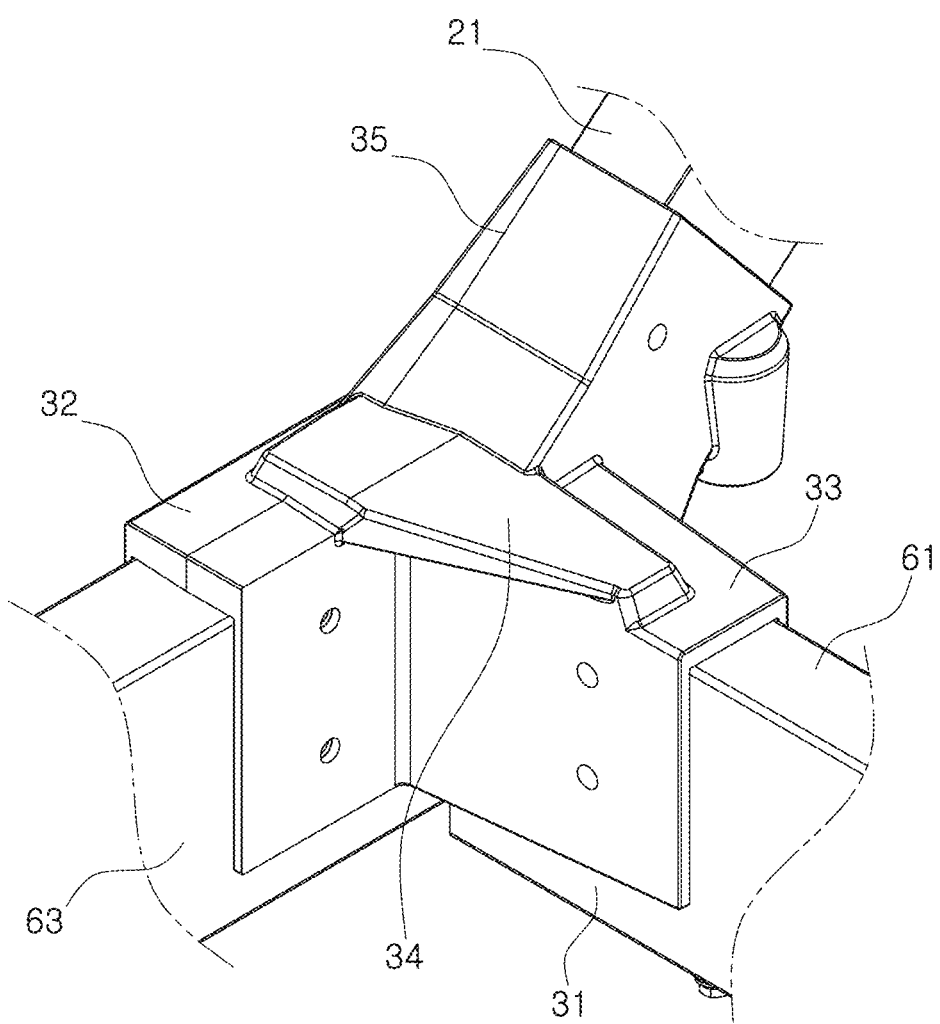
FIG. 29 is a perspective view illustrating a state in which the reinforcement connection part in accordance with the embodiment of the present disclosure is installed on the frame part.
Figure 30:
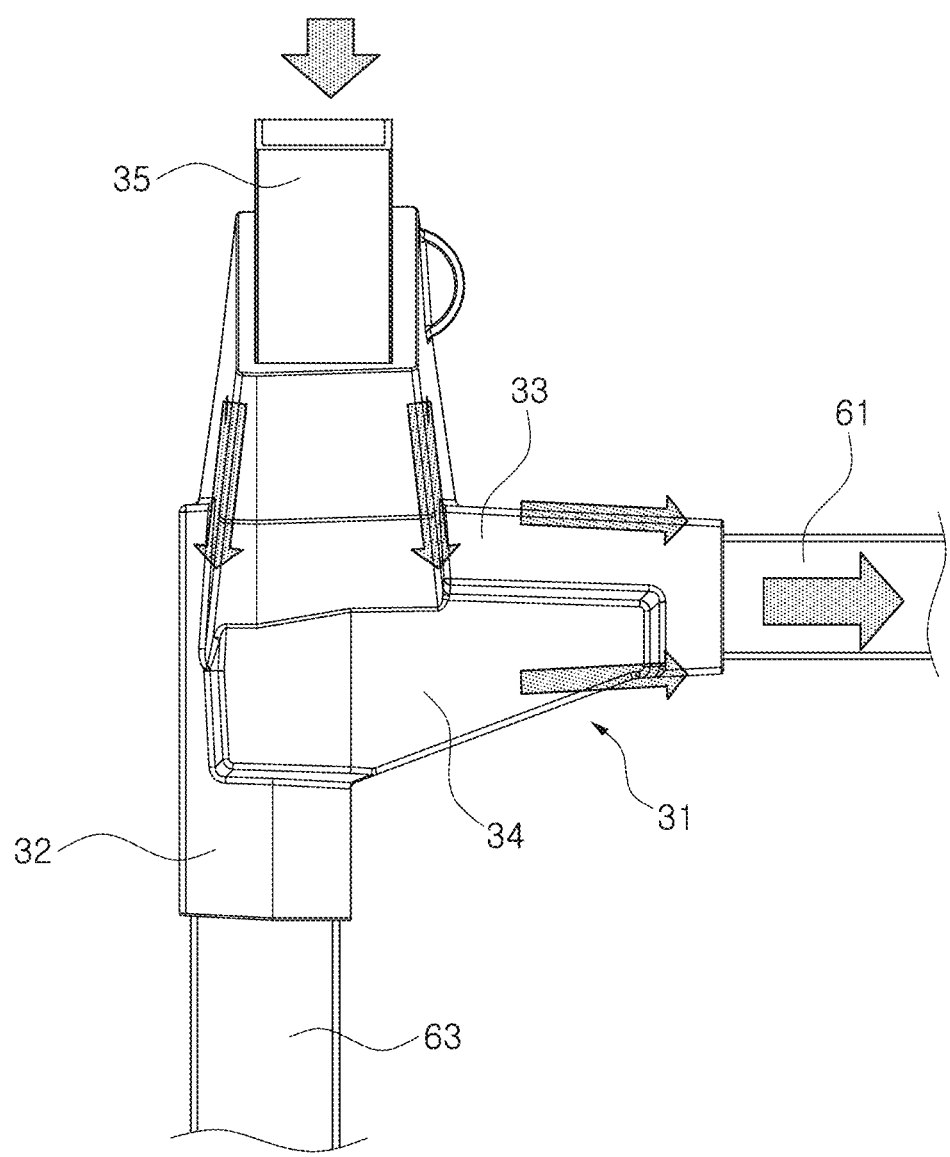
FIG. 30 is a plan view illustrating a state in which a load is transferred along the reinforcement connection part in accordance with the embodiment of the present disclosure.
Figure 31:
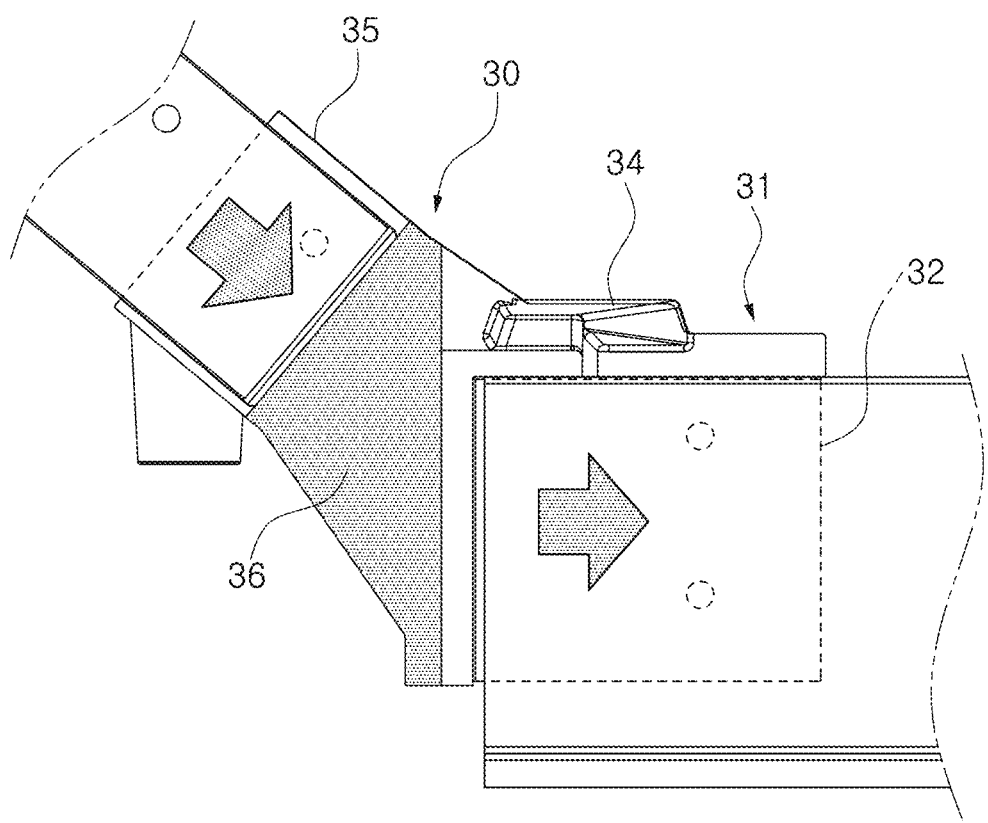
FIG. 31 is a front view illustrating a state in which a load is transferred along the reinforcement connection part in accordance with the embodiment of the present disclosure.

FIG. 26 is a perspective view illustrating a state in which the reinforcement connection part in accordance with the embodiment of the present disclosure is installed, FIG. 27 is a perspective view illustrating the reinforcement connection part in accordance with the embodiment of the present disclosure, FIG. 28 is a bottom view of the reinforcement connection part in accordance with the embodiment of the present disclosure, FIG. 29 is a perspective view illustrating a state in which the reinforcement connection part in accordance with the embodiment of the present disclosure is installed on the frame part, FIG. 30 is a plan view illustrating a state in which a load is transferred along the reinforcement connection part in accordance with the embodiment of the present disclosure, and FIG. 31 is a front view illustrating a state in which a load is transferred along the reinforcement connection part in accordance with the embodiment of the present disclosure.

As illustrated in FIGS. 26 to 31, the reinforcement connection part 30 can be modified in various shapes as long as the reinforcement connection part 30 connects the first connection body 21 and the frame part 60. The reinforcement connection part 30 is installed at the bottom of the first connection body 21 inclined downward toward the frame part 60 from the first support body 12. The reinforcement connection part 30 in accordance with the embodiment of the present disclosure includes a reinforcement connection body part 31, a protruding connection part 35 and a core member 36.

The reinforcement connection body part 31 may be modified in various shapes as long as the reinforcement connection body part 31 is installed in a shape to cover the outside of the frame part 60. The reinforcement connection body part 31 in accordance with the embodiment of the present disclosure includes a first reinforcement body 32, a second reinforcement body 33 and a cover reinforcement part 34. The first reinforcement body 32 is extended in a longitudinal direction D of the frame part 60 and installed in a shape to cover the top and side surfaces of the frame part 60, the second reinforcement body 33 is installed in a direction crossing the first reinforcement body 32 and installed in a shape to cover the top and side surfaces of the frame part 60, and the cover reinforcement part 34 covers the tops of the first and second reinforcement bodies 32 and 33 and distributes stress.

The first reinforcement body 32 is installed in a shape to cover the top surface and both side surfaces of a first or second side support part 63 or 64. The first reinforcement body 32 is installed in a U-shape of which the bottom is open, and provides a structure to reinforce the first and second side support parts 63 and 64.

The second reinforcement body 33 is installed in a shape to cover the outside of the first frame 61, and extended in a direction crossing the first reinforcement body 32 at right angles. The first and second reinforcement bodies 32 and 33 are installed in an L-shape to cover both corners of the frame part 60 facing the first support part 10.

The cover reinforcement part 34 is formed in a plate shape, and installed in a shape to cover the tops of the first and second reinforcement bodies 32 and 33.

The protruding connection part 35 is extended so as to be inclined upward from the reinforcement connection body part 31 toward the first connection body 21, and has a groove into which an end of the first connection body 21 is inserted. The protruding connection part 35 is installed in a trapezoidal shape of which the cross-sectional area gradually increases from one end facing the first connection body 21 toward the other end connected to the reinforcement connection body. Thus, the protruding connection part 35 may easily distribute the load.

The protruding connection part 35 is made of an extruded material for smooth load distribution, and formed in a trapezoidal shape of which the top is narrow and the bottom is wide.

The core member 36 can be modified in various shapes, as long as the core member 36 is located in the protruding connection part 35 and faces the end of the first connection body 21 and the reinforcement connection body part 31. The core member 36 in accordance with the embodiment of the present disclosure is formed in the protruding connection part 35 as one body with the protruding connection part 35, and transfers a load received through the first connection body 21 to the first or second side support part 63 or 64.

Since the core member 36 has a triangle cross-section or a polygonal cross-section close to a triangle while one surface of the core member 36 faces the first connection body 21 and the other surface of the core member 36 faces the first or second side support part 63 or 64, the core member 36 can increase the transfer rate of impact load.

Figure 20:
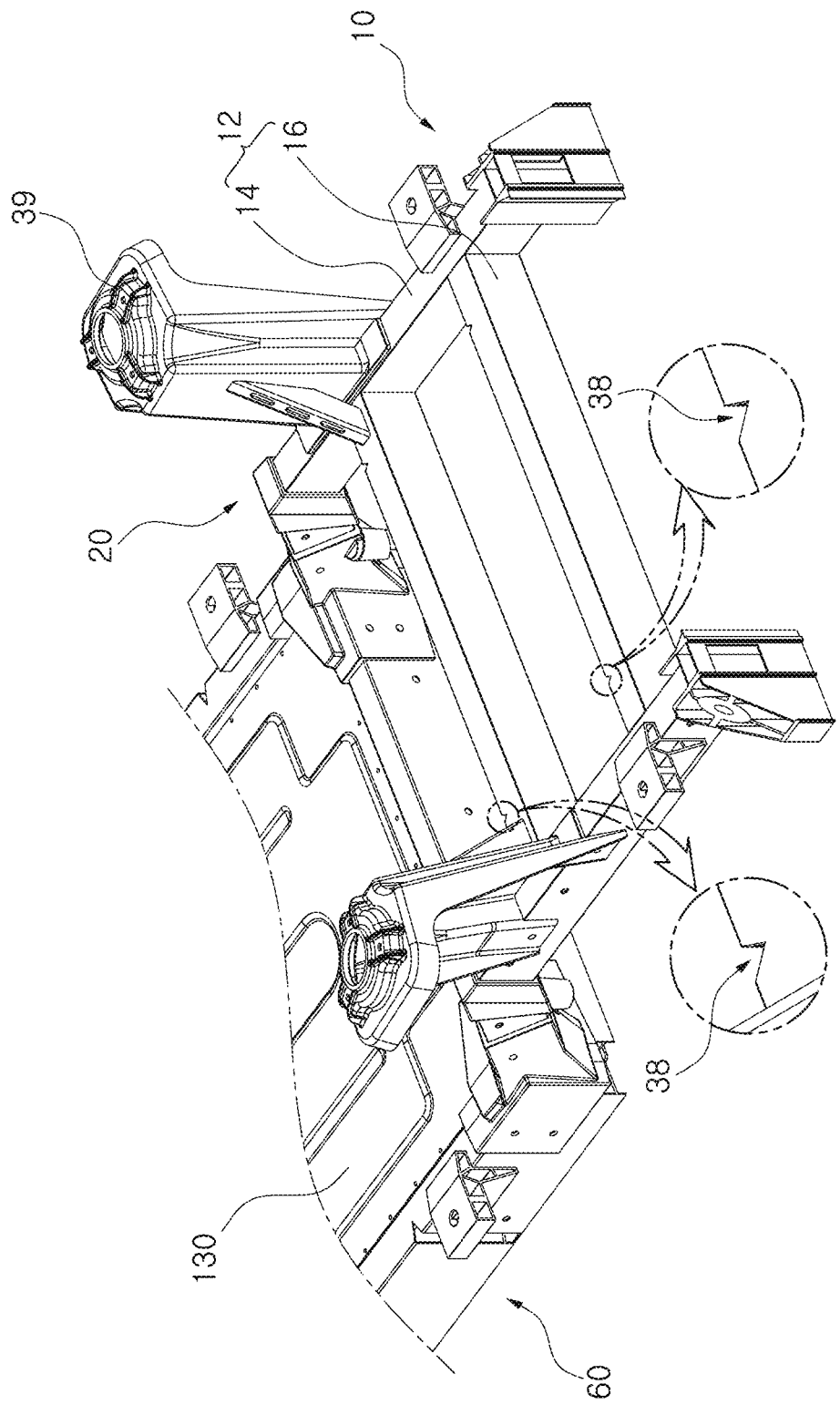
FIG. 20 is a perspective view illustrating a state in which a cutting induction part is installed on a first support body in accordance with the embodiment of the present disclosure.

As illustrated in FIG. 20, the cutting induction part 38 can be modified in various shapes, as long as the cutting induction part 38 is formed as a notch-shaped groove along the first reinforcement frame 16, and induces the first reinforcement frame 16 to be cut when a force equal to or more than a preset value is applied to the first reinforcement frame 16. The cutting induction part 38 in accordance with the embodiment of the present disclosure is installed on either side of the first reinforcement frame 16, and formed as a notch-shaped groove in a top-to-bottom direction.

The shock tower 39 can be modified in various shapes as long as the shock tower 39 protrudes from either side of the first support body 12 and a shock absorber 112 provided on the front wheel chassis module 110 is connected to the shock tower 39. The shock tower 39 in accordance with the embodiment of the present disclosure is extended upward from the first support body 12, and fixed to the first support body 12.

The first support part 10 provides a structure for distributing the weight of a front passenger, and the shock absorber 112 is directly installed on the shock tower 39. Thus, the structure may be assembled more easily than the existing vehicle body connection structure, which makes it possible to improve the precision of vehicle alignment.

As illustrated in FIGS. 1 to 8, the second support part 40 can be modified in various shapes as long as the second support part 40 is extended from the other side of the frame part 60 in the longitudinal direction D and the rear wheel chassis module 120 is mounted on the second support part 40. The second support part 40 which supports the rear wheel chassis module 120 includes a second support body 41 and a second connection part 44. The bottom of the second support body 41 is connected to the rear wheel chassis module 120, and the top of the second support body 41 is connected to the body part 100 of the vehicle. The second connection part 44 connects the second support body 41 and the frame part 60.

The second support body 41 can be modified in various shapes as long as the second support body 41 is installed at a position higher than the frame part 60, and separated from the frame part 60 and extended in the longitudinal direction D. The second support body 41 in accordance with the embodiment of the present disclosure includes a pair of second support frames 42 and a second reinforcement frame 43. The pair of second support frames 42 are spaced apart from each other in the widthwise direction W and installed in parallel to each other, and the second reinforcement frame 43 connects the pair of second support frames 42 in the widthwise direction W.

The second support body 41 is installed in a rectangular shape, the pair of second support frames 42 are installed in parallel to face each other, and ends of the second support frames 42 are connected by the second reinforcement frame 43. At the top of the second support body 41, a rear seat is located. The second support body 41 is detachably installed on the body part 100 of the vehicle.

Figure 21:
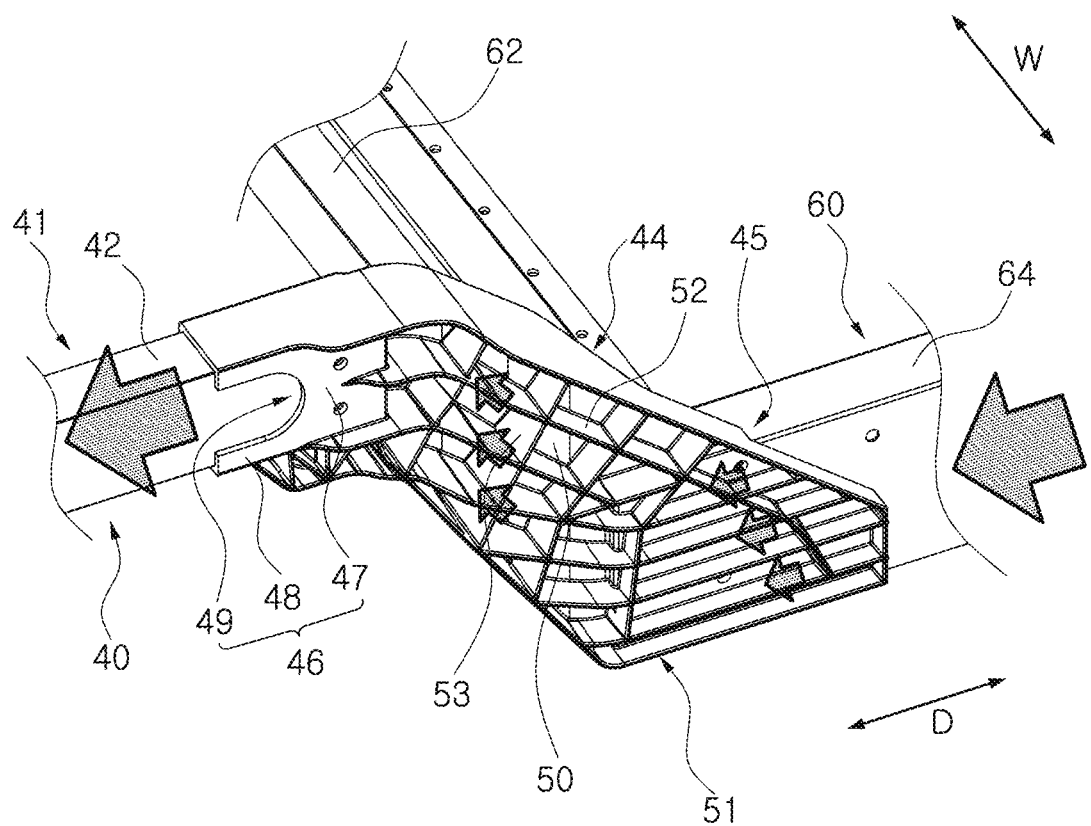
FIG. 21 is a perspective view illustrating a state in which a second connection part in accordance with the embodiment of the present disclosure is installed.
Figure 22:
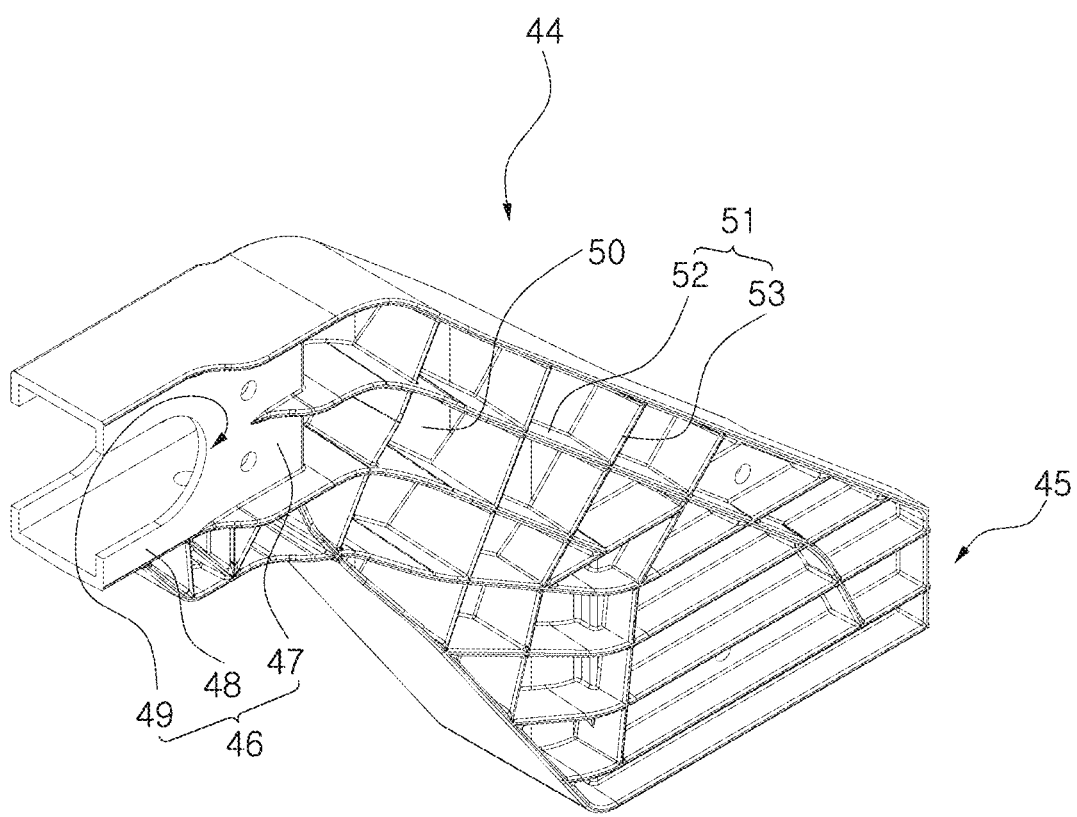
FIG. 22 is a perspective view illustrating the second connection part in accordance with the embodiment of the present disclosure.
Figure 23:
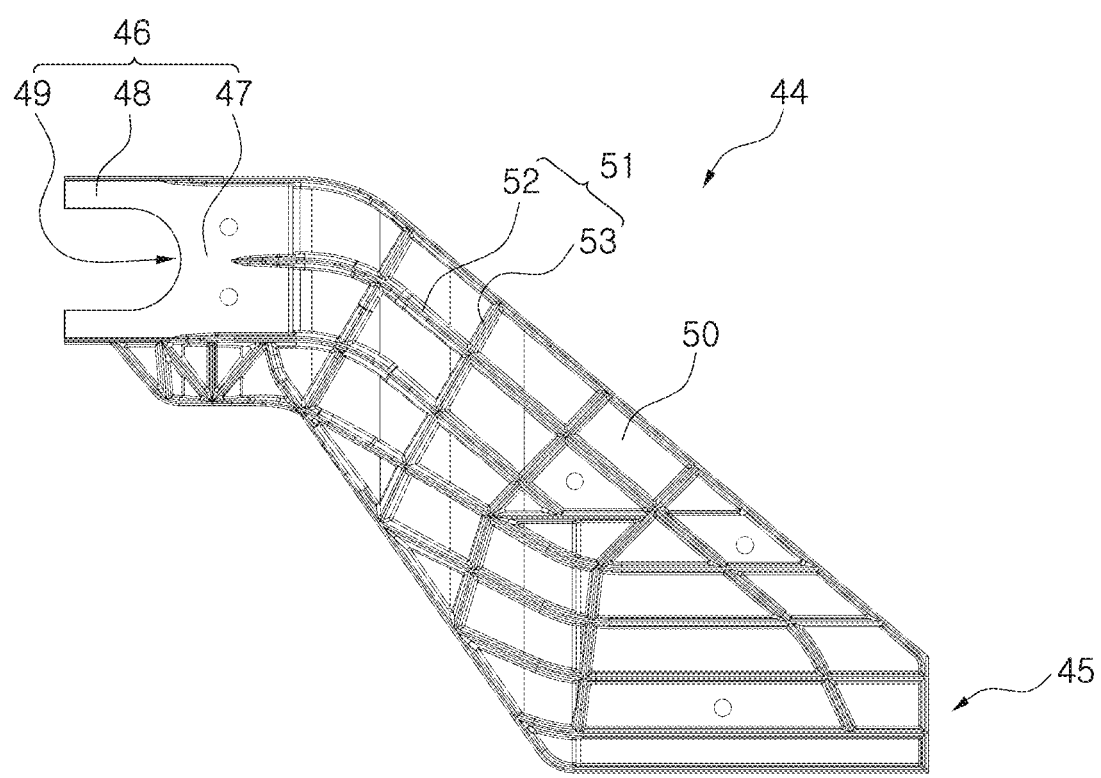
FIG. 23 is a front view illustrating the second connection part in accordance with the embodiment of the present disclosure.
Figure 24:
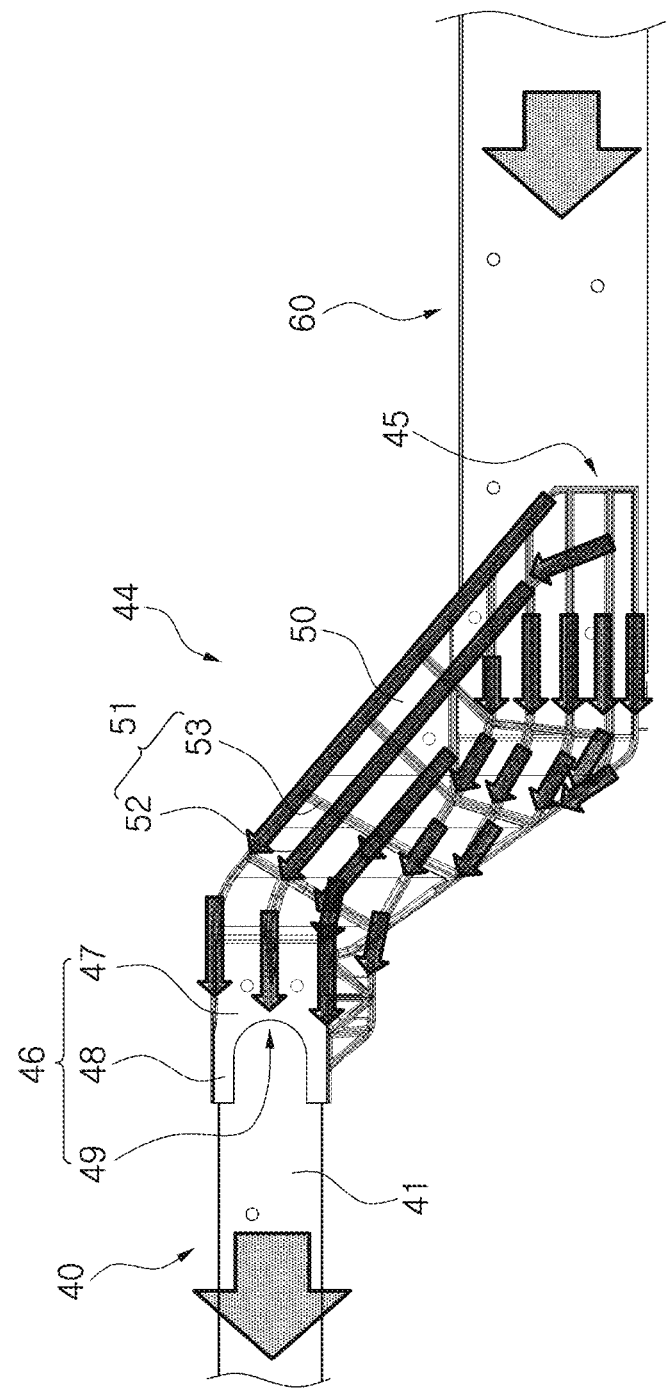
FIG. 24 is a front view illustrating a state in which a load is transferred along the second connection part in accordance with the embodiment of the present disclosure.
Figure 25:
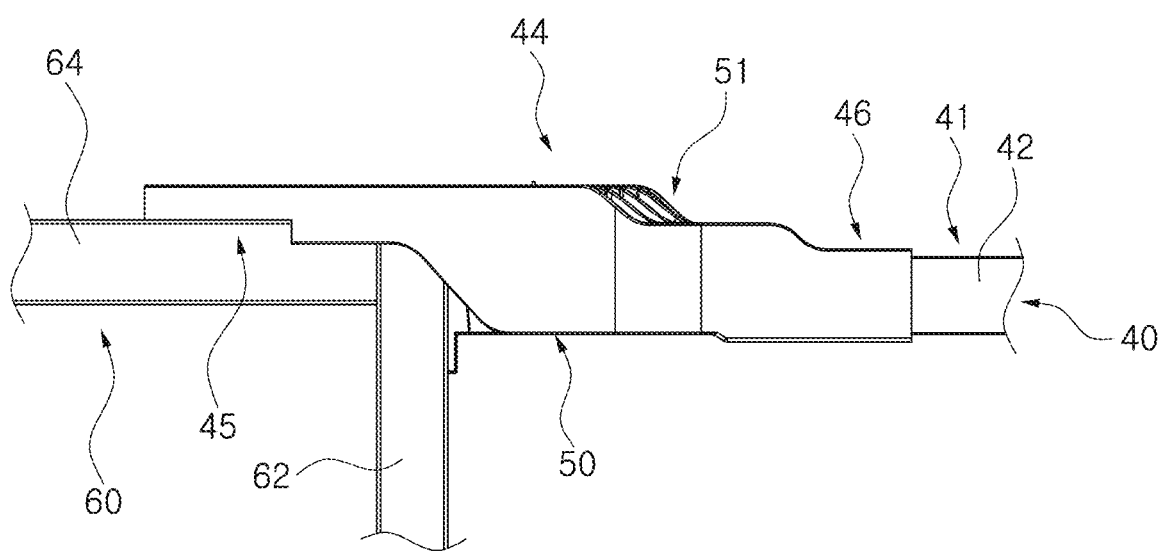
FIG. 25 is a plan view illustrating a state in which the second connection part in accordance with the embodiment of the present disclosure is installed.

FIG. 21 is a perspective view illustrating a state in which the second connection part in accordance with the embodiment of the present disclosure is installed, FIG. 22 is a perspective view illustrating the second connection part in accordance with the embodiment of the present disclosure, FIG. 23 is a front view illustrating the second connection part in accordance with the embodiment of the present disclosure, FIG. 24 is a front view illustrating a state in which a load is transferred along the second connection part in accordance with the embodiment of the present disclosure, and FIG. 25 is a plan view illustrating a state in which the second connection part in accordance with the embodiment of the present disclosure is installed.

As illustrated in FIGS. 21 to 25, the second connection part 44 can be modified in various shapes as long as the second connection part 44 is inclined downward toward the frame part 60 from the second support body 41, and has a rib shape. The second connection part 44 in accordance with the embodiment of the present disclosure includes a first fixed part 45, a second fixed part 46, a second connection body part 50, and a rib reinforcement part 51.

The first fixed part 45 can be modified in various shapes as long as the first fixed part 45 is fixed to the frame part 60. The first fixed part 45 in accordance with the embodiment of the present disclosure is installed in a shape to cover a corner of the frame part 60. Since the first fixed part 45 bent in an L-shape is fixed in a shape to cover the corner of the frame part 60, the first fixed part 45 increases an area through which stress is transferred.

The second fixed part 46 can be modified in various shapes as long as the second fixed part 46 is fixed to the second support body 41. The second fixed part 46 in accordance with the embodiment of the present disclosure includes a second fixed body 47, an extended fixed part 48 and a welding groove 49. The second fixed body 47 has a groove into which an end of the second support body 41 is inserted, and is connected to the second connection body. The extended fixed part 48 is extended from the second fixed body 47 and abuts on a side surface of the second support body 41. The welding groove 49 is formed in a concave shape at an end of the extended fixed part 48.

The second fixed body 47 has a groove into which an end of the second support frame 42 is inserted, and is extended in a horizontal direction. The extended fixed part 48 is extended horizontally from the second fixed body 47, and extended in a shape to cover the top and bottom of the second support frame 42. The extended fixed part 48 is extended horizontally from the second fixed body 47, and extended to either side of the second support frame 42.

The welding groove 49 is formed as a concave groove at an end of the extended fixed part 48. Thus, when the extended fixed part 48 is fixed to the second support frame 42 through welding, the extended fixed part 48 increases a welding area.

The second connection body part 50 can be modified in various shapes as long as the second connection body part 50 connects the first and second fixed parts 45 and 46 and is installed in an inclined shape. The second connection body part 50 in accordance with the embodiment of the present disclosure is formed in a plate shape to connect the first and second fixed parts 45 and 46, and the rib reinforcement part 51 is installed on at least any one of inner and outer surfaces of the second connection body part 50.

The rib reinforcement part 51 can be modified in various shapes, as long as ribs protrude to the outsides of the first fixed part 45, the second fixed part 46 and the second connection body part 50 so as to form a plurality of barriers. The rib reinforcement part 51 in accordance with the embodiment of the present disclosure includes a plurality of first ribs 52 and a plurality of second ribs 53. The first ribs 52 protrude to the outsides of the first fixed part 45 and the second connection body part 50, and are inclined along the second connection body part 50. The second ribs 53 are installed in a direction crossing the first ribs 52, and induce load distribution.

The plurality of first ribs 52 are plate-shape structures protruding outward from the second connection body part 50, and are inclined along the second connection body part 50. The first ribs 52 are installed in a main direction for load transfer.

The second ribs 53 are installed in a direction crossing the first ribs 52, and installed in an auxiliary direction for load distribution. A truss structure for supporting a load is applied to the bottom of the second fixed part 46.

The rib reinforcement part 51 protrudes from either side of the second connection body part 50. Since the welding groove 49 is formed in a U-shape, the length to which welding is applied is increased to induce load distribution. Furthermore, as the main direction of the load transfer coincides with the welding direction, the strength of an end portion of a welded part may be increased.

As illustrated in FIGS. 1 to 8, the frame part 60 can be modified in various shapes as long as one side of the frame part 60 in the longitudinal direction D is connected to the first support part 10, the other side of the frame part 60 in the longitudinal direction D is connected to the second support part 40, and the frame part 60 is installed in a shape to cover the battery 130. The frame part 60 in accordance with the embodiment of the present disclosure includes a first frame 61, a second frame 62, a first side support part 63 and a second side support part 64. The first frame 61 faces one side of the battery 130 in the longitudinal direction D, the second frame 62 faces the other side of the battery 130 in the longitudinal direction D, the first side support part 63 connects the first and second frames 61 and 62 and faces one side of the battery 130 in the widthwise direction W, and the second side support part 64 connects the first and second frames 61 and 62 and faces the other side of the battery 130 in the widthwise direction W.

The frame part 60 further includes a fastening bolt 65 and a protection barrier 66. The fastening bolt 65 fixes a battery base 132, formed on the bottom surface of the battery 130, to at least any one of the first frame 61, the second frame 62, the first side support part 63 and the second side support part 64, and the protection barrier 66 is installed at a position facing the fastening bolt 65, and formed as a barrier protruding to the outside so as to protect the fastening bolt 65.

Since the first and second frames 61 and 62 are installed in parallel to each other and the first and second side support parts 63 and 64 are also installed in parallel to each other, the first frame 61, the first side support part 63, the second frame 62 and the second side support part 64 form a rectangular frame.

The battery 130 positioned in the frame part 60 has a rectangular parallelepiped shape, and the battery base 132 is provided at the bottom of the battery 130. Along the edge of the battery base 132, a first edge 134 at which the fastening bolt 65 is installed and a second edge 136 at which the fastening bolt 65 is not installed are alternately located. The first edge 134 and the second edge 136 form a concavo-convex structure while having different heights.

The fastening bolt 65 passed through the first edge 134 is fixed to at least any one of the first frame 61, the second frame 62, the first side support part 63 and the second side support part 64.

Since the plate-shaped protection barrier 66 which protrudes downward from the first frame 61, the second frame 62, the first side support part 63 and the second side support part 64 is located on the outside facing the fastening bolt 65, it is possible to prevent damage to the fastening bolt 65.

Figure 19:
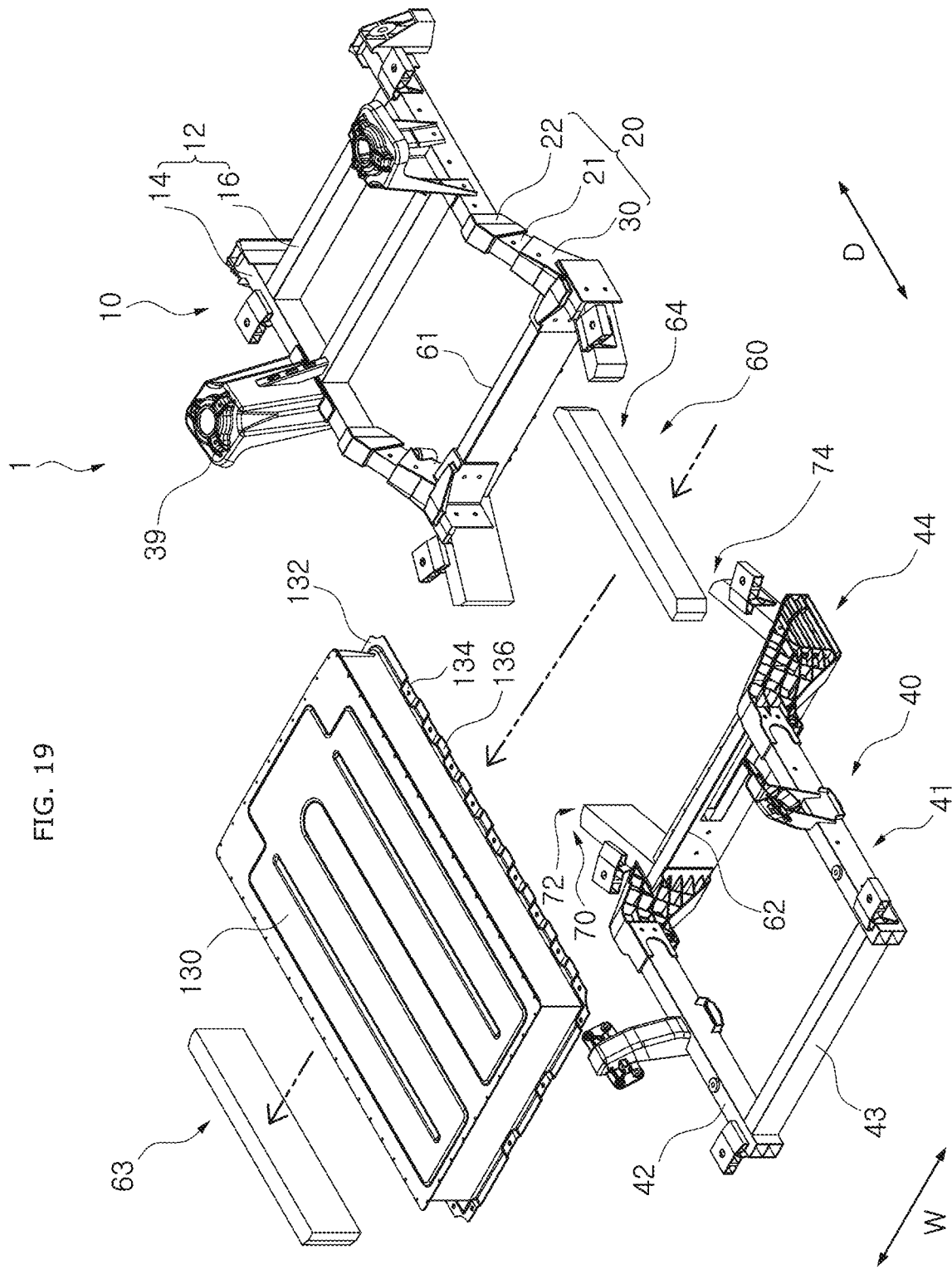
FIG. 19 is a perspective view illustrating a state in which a battery is moved in a lateral direction while a separation induction part is broken in accordance with the embodiment of the present disclosure.

FIG. 19 is a perspective view illustrating a state in which the battery is moved in a lateral direction while the separation induction part is broken in accordance with the embodiment of the present disclosure, and FIG. 20 is a perspective view illustrating a state in which the cutting induction part is installed on the first support body in accordance with the embodiment of the present disclosure.

As illustrated in FIGS. 19 and 20, the separation induction part 70 can be modified in various shapes, as long as the separation induction part 70 is installed on at least any one of the frame parts 60 facing both side surfaces of the battery 130, and induces the battery 130 to be separated in a direction opposite to the direction in which an impact is applied. The separation induction part 70 in accordance with the embodiment of the present disclosure is formed as a notched-shaped groove in at least any one of the first and second side support parts 63 and 64.

The separation induction part 70 in accordance with the embodiment of the present disclosure includes a first induction part 72 and a second induction part 74. The first induction part 72 is formed as a notch-shaped groove at a side surface of the first side support part 63, and the second induction part 74 is formed as a notch-shaped groove at a side surface of the second side support part 64.

The plurality of first induction parts 72 are installed in the longitudinal direction D of the first side support part 63, and the notch-shaped grooves are extended in the top-to-bottom direction. The plurality of second induction parts 74 are installed in the longitudinal direction D of the second side support part 64, and the notch-shaped grooves are extended in the top-to-bottom direction.

Since the separation induction part 70 is broken in case of a side collision of the vehicle, the impact applied to the battery 130 can be distributed, and the battery 130 is separated from the vehicle in order to prevent an additional explosion accident of the battery 130, caused by the impact or high temperature.

The notched-shaped separation induction part 70 is buckled on the side where the impact is applied, and broken on the direction opposite to the side where the impact is applied, thereby inducing the separation of the battery 130.

Figure 13:
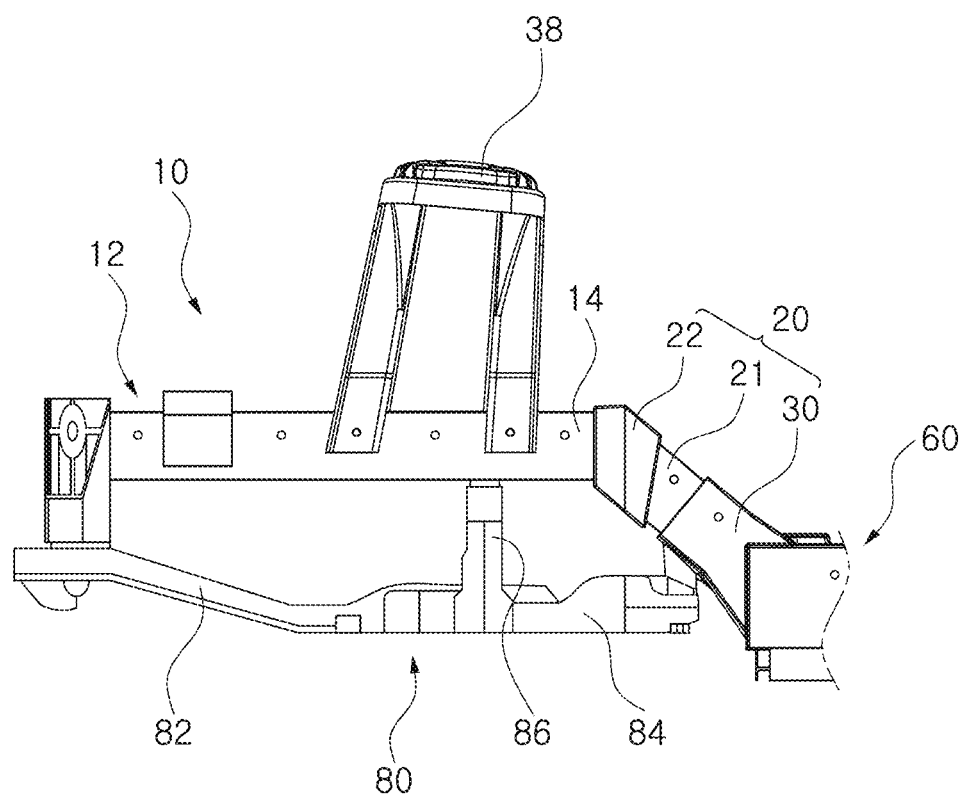
FIG. 13 is a front view illustrating a state in which the stress distribution part in accordance with the embodiment of the present disclosure is fixed to the bottom of the first support part.
Figure 14:
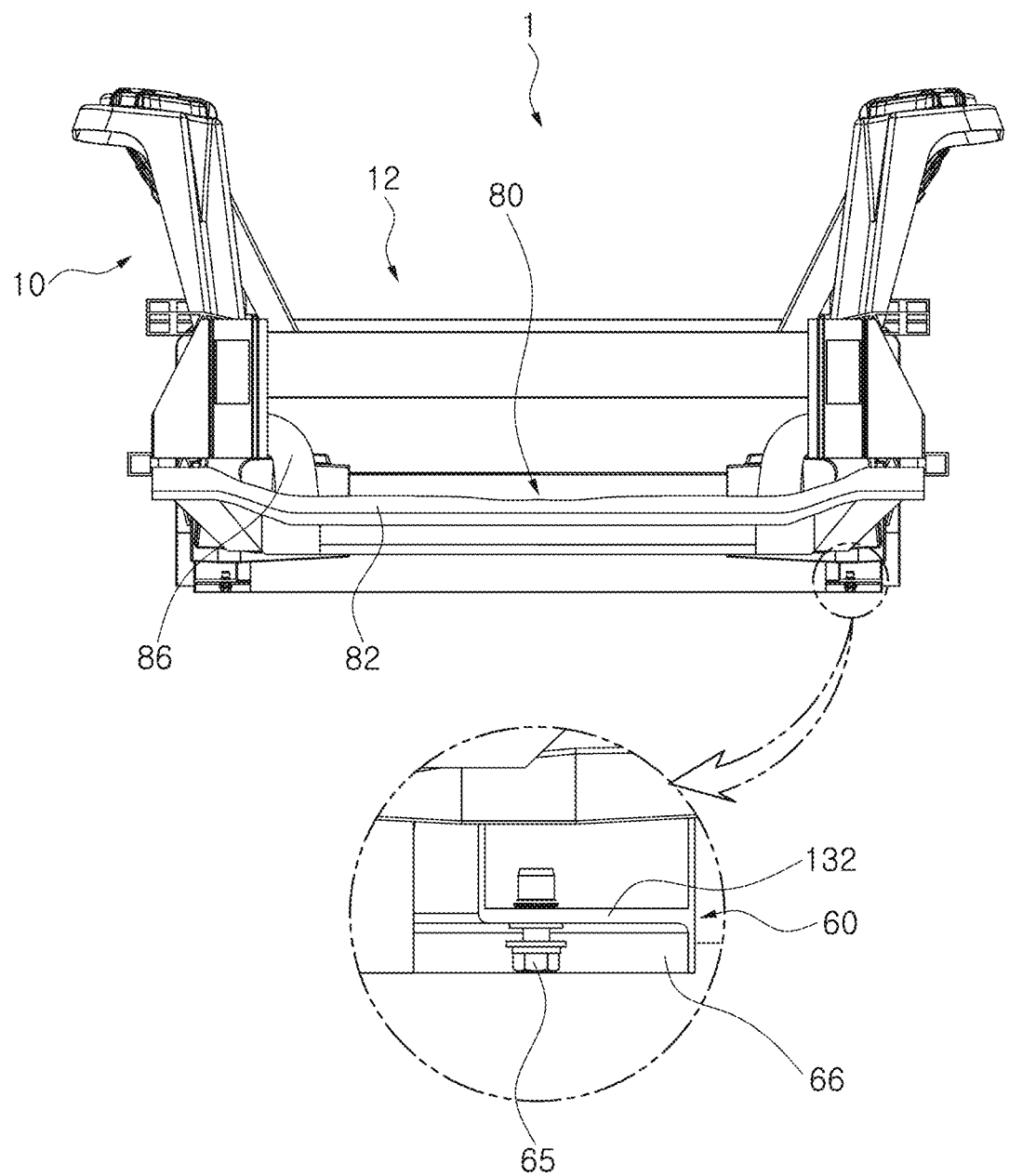
FIG. 14 is a side view illustrating a state in which the stress distribution part in accordance with the embodiment of the present disclosure is fixed to the bottom of the first support part.
Figure 15:
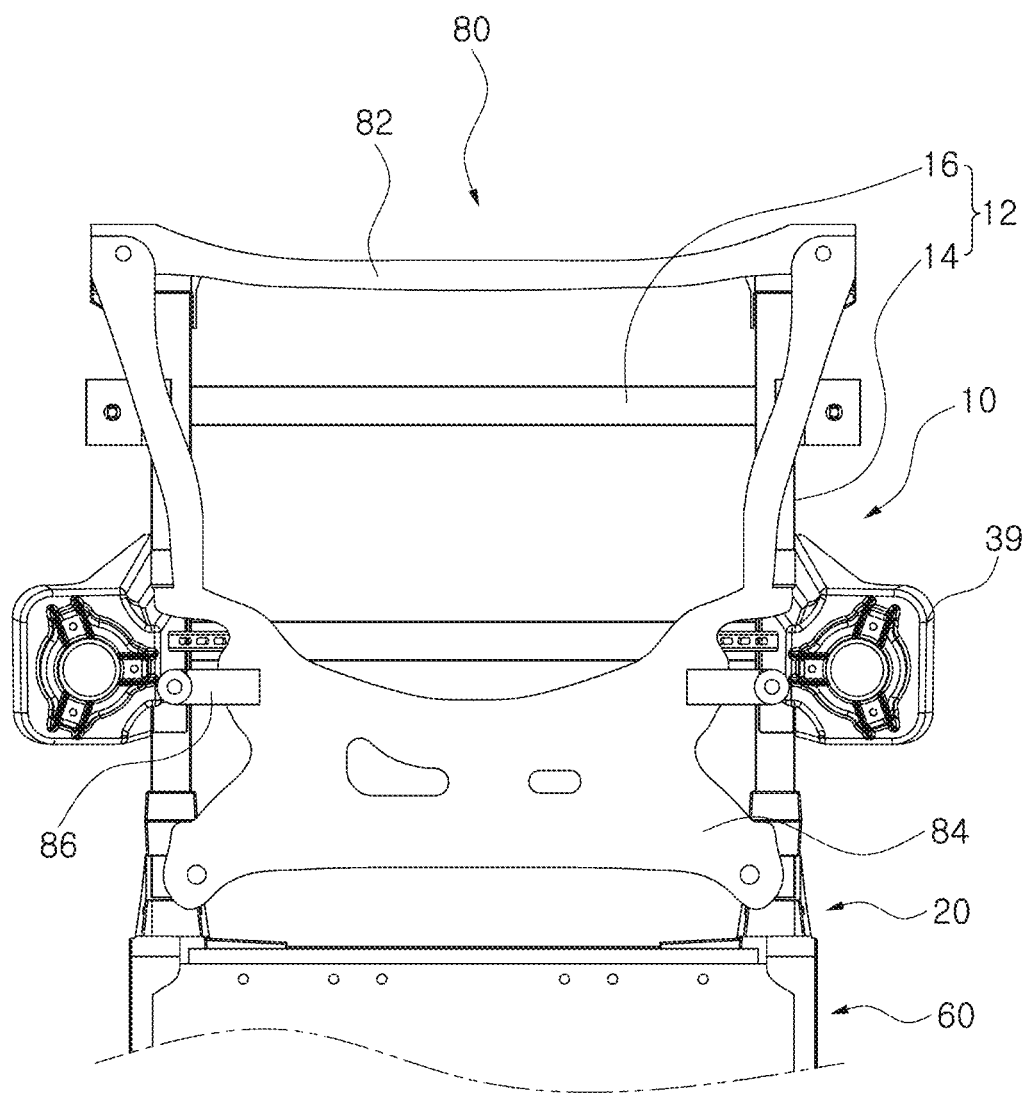
FIG. 15 is a bottom view illustrating a state in which the stress distribution part in accordance with the embodiment of the present disclosure is fixed to the bottom of the first support part.
Figure 16:
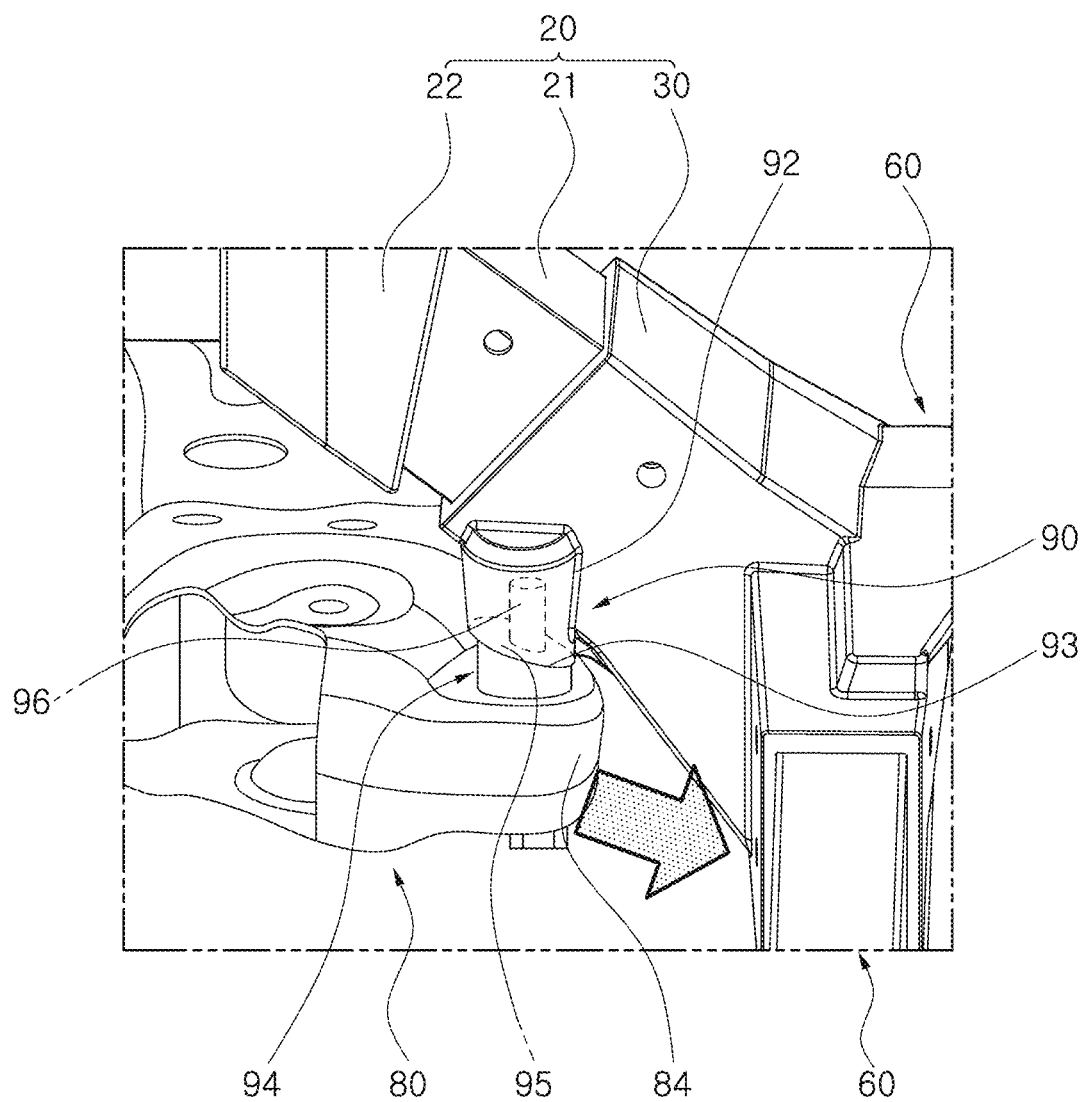
FIG. 16 is a perspective view illustrating a state in which a movement guide part in accordance with the embodiment of the present disclosure is installed.
Figure 17:
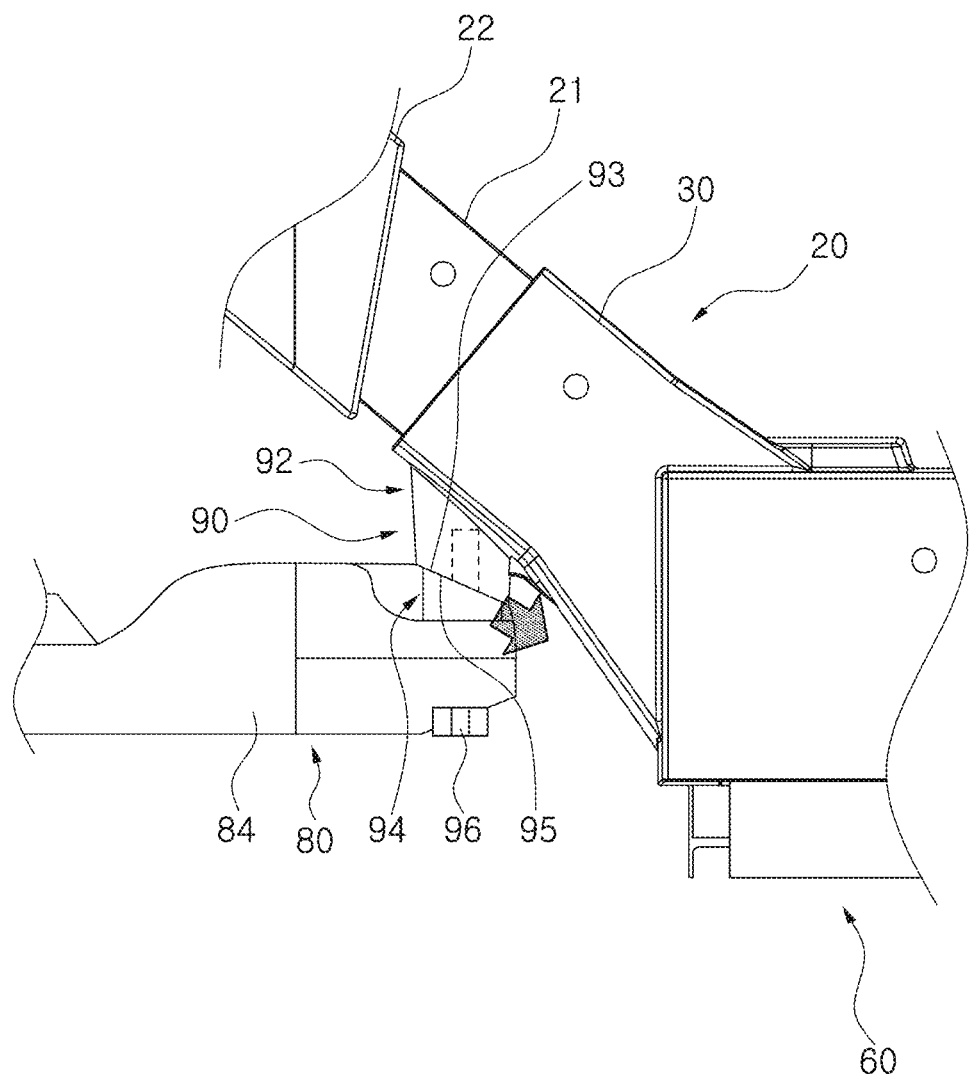
FIG. 17 is a front view illustrating a state in which the movement guide part in accordance with the embodiment of the present disclosure is installed.
Figure 18:
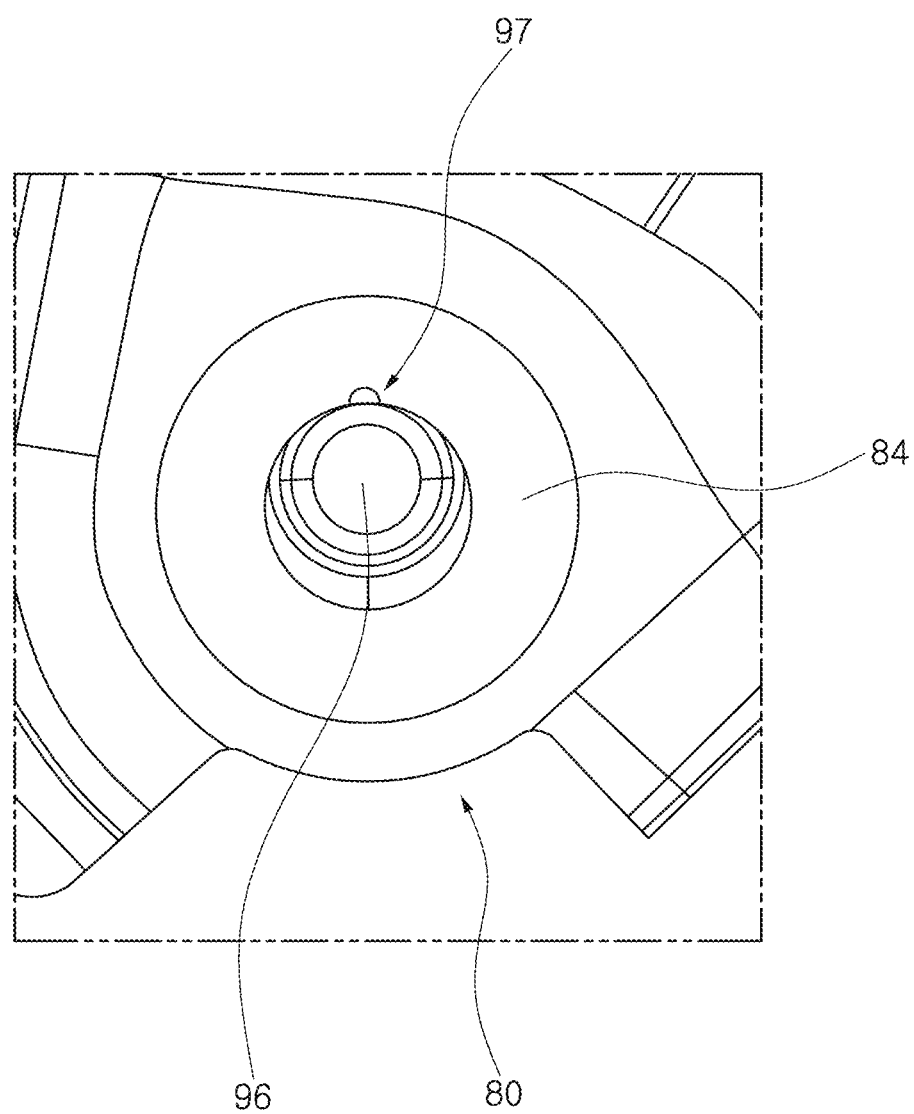
FIG. 18 is a bottom view illustrating a state in which a breakage induction part in accordance with the embodiment of the present disclosure is installed.

FIG. 13 is a front view illustrating a state in which the stress distribution part in accordance with the embodiment of the present disclosure is fixed to the bottom of the first support part, FIG. 14 is a side view illustrating a state in which the stress distribution part in accordance with the embodiment of the present disclosure is fixed to the bottom of the first support part, FIG. 15 is a bottom view illustrating a state in which the stress distribution part in accordance with the embodiment of the present disclosure is fixed to the bottom of the first support part, FIG. 16 is a perspective view illustrating a state in which the movement guide part in accordance with the embodiment of the present disclosure is installed, FIG. 17 is a front view illustrating a state in which the movement guide part in accordance with the embodiment of the present disclosure is installed, and FIG. 18 is a bottom view illustrating a state in which a breakage induction part in accordance with the embodiment of the present disclosure is installed.

As illustrated in FIGS. 13 to 18, the stress distribution part 80 can be modified in various shapes as long as the stress distribution part 80 is connected to the first support part 10 and distributes stress transferred to the frame part 60 from the first support part 10. The stress distribution part 80 in accordance with the embodiment of the present disclosure includes a cross member 82 coupled to the bottom of the first support part 10, a fixed bracket 84 extended from the cross member 82 and fixed to the first support part 10 or the frame part 60, and a connection wing member 86 extended from the fixed bracket 84 and fixed to the first support part 10.

The cross member 82 constitutes a frame which forms a closed curve. A load moved through the first support part 10 and the stress distribution part 80 is moved along the frame part 60 positioned on either side of the battery 130, and then distributed while moved to the second support part 40.

As illustrated in FIGS. 16 to 18, the movement guide part 90 can be modified in various shapes as long as the movement guide part 90 guides the stress distribution part 80 downward along the first support part 10 in case of an accident of the vehicle. The movement guide part 90 in accordance with the embodiment of the present disclosure includes a first inclined guide part 92, a second inclined guide part 94, a fixed member 96 and a breakage induction part 97.

The first inclined guide part 92 can be modified in various shapes as long as the first inclined guide part 92 is extended from the first connection part 20 toward the fixed bracket 84 of the stress distribution part 80 and has a first inclined surface 93 formed at the bottom thereof. The first inclined guide part 92 in accordance with the embodiment of the present disclosure is extended downward from the reinforcement connection part 30, and the first inclined surface 93 is inclined downward toward the frame part 60.

The second inclined guide part 94 can be modified in various shapes as long as the second inclined guide part 94 has a second inclined surface 95 which protrudes from the fixed bracket 84 and abuts on the first inclined surface 93. The second inclined guide part 94 in accordance with the embodiment of the present disclosure protrudes upward from the stress distribution part 80, and the second inclined surface 95 is inclined downward toward the frame part 60.

The fixed member 96 can be modified in various shapes as long as the fixed member 96 is fixed to the first inclined guide part 92 through the second inclined guide part 94. As the fixed member 96 in accordance with the embodiment of the present disclosure, a bolt is used.

The breakage induction part 97 is formed as a notch-shaped groove at the second inclined surface 95 facing the fixed member 96, and induces the fixed member 96 to be cut in case of a collision of the vehicle.

By the installation of the movement guide part 90, the stress distribution part 80 may be guided to move toward the bottom of the frame part 60 in case of a collision of the vehicle, and reduce collision energy, thereby reducing damage to a passenger.

Furthermore, the breakage induction part 97 induces the fixed member 96 to be broken after the collision of the vehicle, such that the path of the stress distribution part 80 is inclined downward, thereby preventing the stress distribution part 80 from being moved toward the driver seat.

Since the first and second inclined surfaces 93 and 95 are brought into surface contact with each other in a diagonal direction, the stress distribution part 80 is guided to move toward the bottom of the frame part 60 in case of a collision of the vehicle, which makes it possible to secure the stability of a driver.

Furthermore, since the breakage induction part 97 is located in front of the fixed member 96, the breakage induction part 97 is moved toward the fixed member 96 in case of a collision of the vehicle, and breaks the fixed member 96. Thus, the stress distribution part 80 can be more easily moved in a downward inclined direction.

In accordance with the embodiment of the present disclosure, the front wheel chassis module 110, the stress distribution part 80 and the movement guide part 90 are connected to the first support part 10, the rear wheel chassis module 120 is connected to the second support part 40, and the battery 130 is mounted on the frame part 60 so as to form an integrated module. The integrated module is coupled to the body part 100 of the vehicle.

Hereafter, the operation state of the chassis platform module 1 for an electric vehicle in accordance with the embodiment of the present disclosure will be described with reference to the accompanying drawings.

As illustrated in FIGS. 7, 9 and 10, an impact transferred from the front to the rear of the vehicle is distributed while being moved to the frame part 60 through the first support part 10 and the stress distribution part 80, and then moved to the second support part 40.

As illustrated in FIG. 8, when the cutting induction part 38 is formed in the first reinforcement frame 16 and a load equal to or more than a preset load is transferred to the first reinforcement frame 16, the first reinforcement frame 16 may be cut to prevent damage to another member.

As illustrated in FIGS. 16 to 18, the fixed bracket 84 having the breakage induction part 97 installed thereon is moved toward the fixed member 96 and breaks the fixed member 96, in case of a forward collision of the vehicle.

Since the first and second inclined guide parts 92 and 94 are inclined to abut on each other, the stress distribution part 80 is moved in a downward inclined direction toward the bottom of the frame part 60.

As illustrated in FIG. 19, when an impact is applied in the widthwise direction W of the vehicle, the separation induction part 70 located in the application direction of the impact is bent or broken, and the separation induction part 70 located in the direction opposite to the application direction of the impact is broken. Thus, the shape of the frame part 60 is deformed.

Therefore, the battery 130 may be separated toward the outside of the frame part 60. In case of an accident of the vehicle, damage to the battery 130 can be minimized, and an explosion accident of the battery 130 can be prevented.

As illustrated in FIGS. 21 to 25, a load moved along the frame part 60 is transferred in an upward inclined direction along the second connection part 44, and transferred to the second support part 40. At this time, since the plurality of first ribs 52 are provided, the load is more easily distributed and moved.

As illustrated in FIGS. 26 to 30, the load moved through the first connection body 21 is moved downward through the protruding connection part 35, and then transferred to the frame part 60 through the reinforcement connection body part 31.

As illustrated in FIGS. 31 to 35, the load moved along the first support frame 14 is transferred to the first connection body 21 through the connector part 22. At this time, the area through which the load is transferred may be increased through the connection body part 25. Thus, the load may be more easily transferred and distributed.

As described above, the separation induction part 70 formed as a notch-shaped groove is installed on either side of the frame part 60 facing the battery 130, and broken to induce the battery 130 to be separated in a lateral direction in case of a side collision of the vehicle. Thus, the impact transferred to the battery 130 can be distributed to prevent a safety accident.

Furthermore, the front wheel chassis module 110 is connected to the first support part 10, the rear wheel chassis module 120 is connected to the second support part 40, and the battery 130 is mounted on the frame part 60 so as to form an integrated module. Then, the integrated module is coupled to the body part 100 of the vehicle. Thus, the design of the body part 100 of the vehicle can be easily changed, which makes it possible to reduce the manufacturing cost while raising the degree of freedom in design of the vehicle.

Furthermore, since stress transferred from the first support part 10 and the frame part 60 is distributed by the installation of the stress distribution part 80, the load distribution may be induced in case of a collision of the vehicle, and the collision stability may be improved.

Furthermore, the first connection body 21 and the first support body 12 are connected through the connector part 22, and the load transfer between the first connection body 21 and the first support body 12 is easily performed through the connector part. Thus, the structural stiffness may be increased to improve the durability of a product.

Furthermore, the stress distribution part 80 which distributes stress transferred from the first support part 10 to the frame part 60 in case of a collision of the vehicle may be moved toward the bottom of the frame part 60 by the movement guide part 90, which makes it possible to reduce damage to a driver while improving collision stability.

Furthermore, since the reinforcement connection part 30 connecting the first connection body 21 and the frame part 60 is used, the structural stiffness may be increased to improve the durability of a product.

Furthermore, the second connection part 44 which connects the frame part 60 and the second support body 41 and has a rib shape may easily transfer an impact in case of a collision of the vehicle, and the optimal durability can be secured through the load distribution.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A chassis platform module for an electric vehicle, comprising:
    a frame part having a battery mounted thereon;
    a first support part extended from one side of the frame part in a longitudinal direction, and having a front wheel chassis module mounted thereon; and
    a second support part extended from the other side of the frame part in the longitudinal direction, and having a rear wheel chassis module mounted thereon,
    wherein the first support part comprises: a first support body having a bottom side connected to the front wheel chassis module and a top side connected to a body part of a vehicle; and a first connection part configured to connect the first support body and the frame part.

2. The chassis platform module of claim 1, wherein the frame part comprises:
    a first frame facing one side of the battery in the longitudinal direction; a second frame facing the other side of the battery in the longitudinal direction;
    a first side support part configured to connect the first and second frames, and facing one side of the battery in a widthwise direction; and
    a second side support part configured to connect the first and second frames, and facing the other side of the battery in the widthwise direction.

3. The chassis platform module of claim 2, wherein the frame part further comprises:
    a fastening bolt configured to a battery base, provided on the bottom surface of the battery, to at least any one of the first frame, the second frame, the first side support part and the second side support part; and
    a protection barrier installed at a position facing the fastening bolt, formed as a barrier protruding outward, and configured to protect the fastening bolt.

4. The chassis platform module of claim 1, wherein the first support body is installed at a position higher than the frame part.

5. The chassis platform module of claim 1, wherein the first connection part is inclined downward toward the frame part from the first support body.

6. The chassis platform module of claim 1, wherein the first support part further comprises a shock tower protruding from either side of the first support body, and connected to a shock absorber provided on the front wheel chassis module.

7. The chassis platform module of claim 1, further comprising:
    a stress distribution part connected to the first support part, and configured to distribute stress transferred to the frame part from the first support part; and a movement guide part configured to guide the stress distribution part to move downward along the first support part in case of an accident of the vehicle.

8. The chassis platform module of claim 7, wherein the stress distribution part comprises:
a cross member coupled to the bottom of the first support part; and a fixed bracket extended from the cross member and fixed to the first support part or the frame part.

9. The chassis platform module of claim 8, wherein the movement guide part comprises:
a first inclined guide part extended from the first connection part toward the fixed bracket, and having a first inclined surface formed at the bottom thereof;
a second inclined guide part having a second inclined surface which protrudes from the fixed bracket and abuts on the first inclined surface; and
a fixed member fixed to the first inclined guide part through the second inclined guide part.

10. The chassis platform module of claim 1, wherein the first connection part comprises:
a first connection body connected to the frame part; and
a connector part configured to connect the first connection body and the first support body.

11. The chassis platform module of claim 10, wherein the connector part comprises:
a first coupling part having a groove into which an end of the first support body is inserted;
a second coupling part having a groove into which an end of the first connection body is inserted; and
a connection body part configured to connect the first coupling part and the second coupling part.

12. The chassis platform module of claim 11, wherein the connector part further comprises a weight reduction part connected to the first coupling part, and installed at a position facing an end of the first connection body with the connection body part interposed therebetween.

13. A chassis platform module for an electric vehicle, comprising:
a frame part having a battery mounted thereon;
a first support part extended from one side of the frame part in a longitudinal direction, and having a front wheel chassis module mounted thereon; and
a second support part extended trom the other side of the trame part in the longitudinal direction, and having a rear wheel chassis module mounted thereon, wherein the second support part comprises:

a second support body having a bottom side connected to the rear wheel chassis module and a top side connected to the body part of the vehicle; and
a second connection part configured to connect the second support body and the frame part.

14. The chassis platform module of claim 13, wherein the second support body is installed at a position higher than the frame part.

15. The chassis platform module of claim 13, wherein the second connection part is inclined downward toward the frame part from the second support body.

16. The chassis platform module of claim 15, wherein the front wheel chassis module is connected to the first support part, the rear wheel chassis module is connected to the second support part, the battery is mounted on the frame part to form an integrated module, and the integrated module is coupled to the body part of the vehicle.

17. A chassis platform module for an electric vehicle, comprising:
a first frame facing one side of a battery in a longitudinal direction;
a second frame facing the other side of the battery in the longitudinal direction;
a first side support part configured to connect the first and second frames, and facing one side of the battery in a widthwise direction;
a second side support part configured to connect the first and second frames, and facing the other side of the battery in the widthwise direction; and
a separation induction part installed on at least any one of the first and second side support parts, and configured to induce the battery to be separated in a direction opposite to the direction in which impact is applied.

18. The chassis platform module of claim 17, wherein the separation induction part comprises:
a first induction part formed as a notch-shaped groove at a side surface of the first side support part; and
a second induction part formed as a notch-shape groove at a side surface of the second side support part.

19. The chassis platform module of claim 18, wherein the plurality of first induction parts are installed in the longitudinal direction of the first side support part, and the notch-shaped grooves are extended in a top-to-bottom direction, wherein the plurality of second induction parts are installed in the longitudinal direction of the second side support part, and the notch-shaped grooves are extended in the top-to-bottom direction.

* * * * *